(12) United States Patent
Ishikawa

(10) Patent No.: US 7,346,207 B2
(45) Date of Patent: *Mar. 18, 2008

(54) IMAGE DEFECT INSPECTION METHOD, IMAGE DEFECT INSPECTION APPARATUS, AND APPEARANCE INSPECTION APPARATUS

(75) Inventor: Akio Ishikawa, Hachioji (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 11/298,113

(22) Filed: Dec. 8, 2005

(65) Prior Publication Data

US 2006/0159333 A1 Jul. 20, 2006

(30) Foreign Application Priority Data

Jan. 19, 2005 (JP) .............................. 2005-011420

(51) Int. Cl.
 *G06K 9/00* (2006.01)
(52) U.S. Cl. ..................... 382/145; 382/149; 382/168; 382/169; 382/172
(58) Field of Classification Search ................ 382/149, 382/168, 169, 172
 See application file for complete search history.

(56) References Cited

U.S. PATENT DOCUMENTS 4,868,651 A * 9/1989 Chou et al. ................. 378/98.7
6,137,541 A * 10/2000 Murayama .................. 348/673

(Continued)

FOREIGN PATENT DOCUMENTS

JP 4-107946 4/1992

(Continued)

OTHER PUBLICATIONS

Patent Abstracts of Japan, Publication No. 04107946 A; Publication Date Apr. 9, 1992; in the name of Taniguchi, et al.

(Continued)

*Primary Examiner*—Bhavesh M. Mehta
*Assistant Examiner*—John B Strege
(74) *Attorney, Agent, or Firm*—Christie, Parker & Hale, LLP

(57) ABSTRACT

In an image defect inspection method and apparatus which detects a gray level difference between corresponding portions of two images, automatically sets a threshold value based on the distribution thereof, compares the gray level difference with the threshold value, and judges one or the other of the portions to be defective if the gray level difference is larger than the threshold value, provisions are made to correct the threshold value when the distribution of the gray level difference is different from the usual distribution, thereby achieving high detection sensitivity while suppressing the occurrence of false defects. To achieve this object, the cumulative frequency of the gray level difference is computed (S3); a converted cumulative frequency is computed by converting the cumulative frequency so that the cumulative frequency shows a linear relationship with respect to the gray level difference when the gray level difference is assumed to exhibit a distribution that obeys a prescribed type of distribution (S4); an approximation curve of the converted cumulative frequency is derived (S11); the second derivative of the approximation curve with respect to the gray level difference is computed (S12); and the threshold value is corrected in accordance with the second derivative (S13).

21 Claims, 19 Drawing Sheets

U.S. PATENT DOCUMENTS 6,993,183 B2 * 1/2006 Inoue .................. 382/170
2004/0062432 A1 4/2004 Ishikawa
2005/0013475 A1 * 1/2005 Levin et al. ............ 382/145

FOREIGN PATENT DOCUMENTS

| JP | 2996263 | 10/1999 |
|---|---|---|
| JP | 2002-22421 | 1/2002 |
| JP | 2004-177397 | 6/2004 |

OTHER PUBLICATIONS

Patent Abstracts of Japan, Publication No. 05047886 A; Publication Date Feb. 26, 1993; in the name of Jingu.

Patent Abstracts of Japan, Publication No. 2002022421 A, Publication Date Jan. 23, 2002; in the name of Hikita, et al.

Patent Abstracts of Japan, Publication No. 2004177397 A, Publication Date Jun. 24, 2004, in the name of Ishikawa.

* cited by examiner

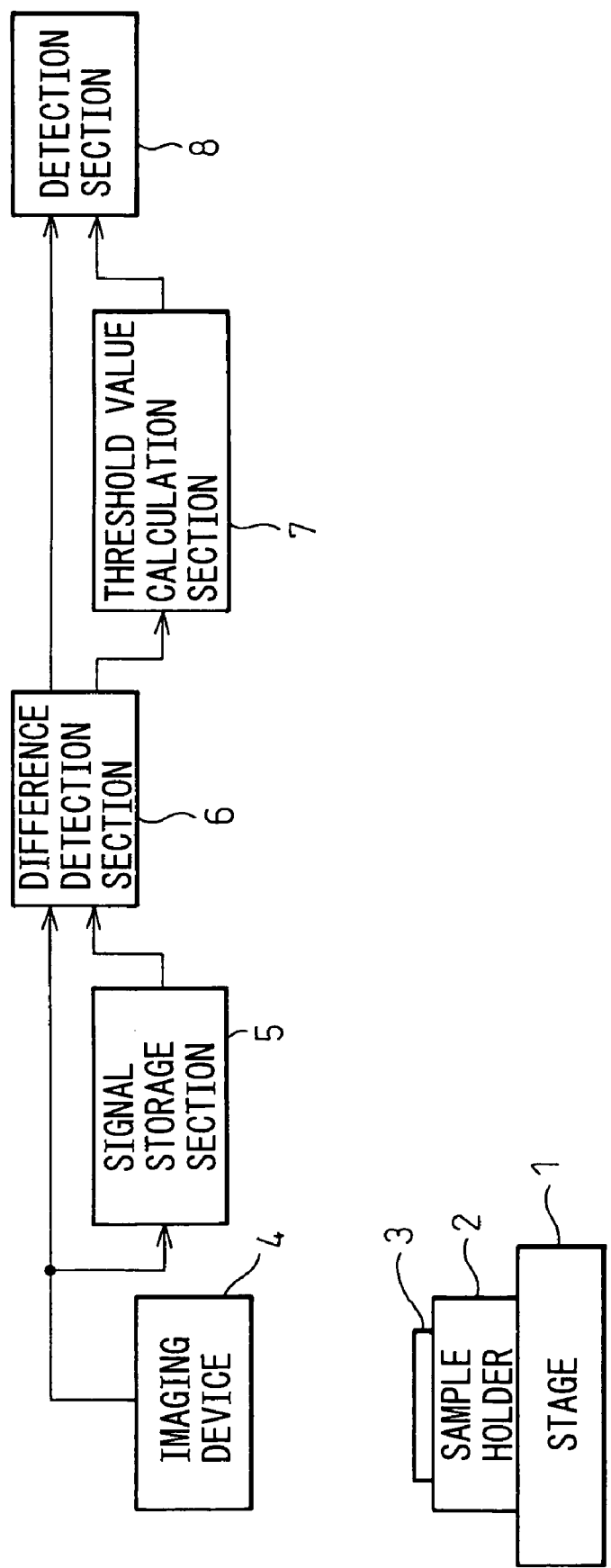

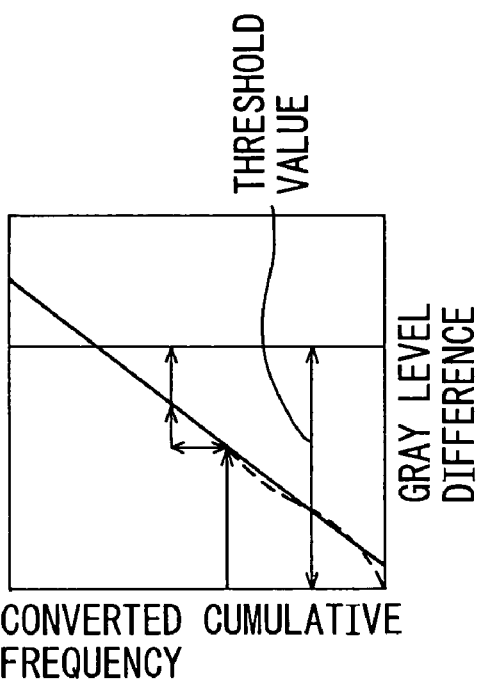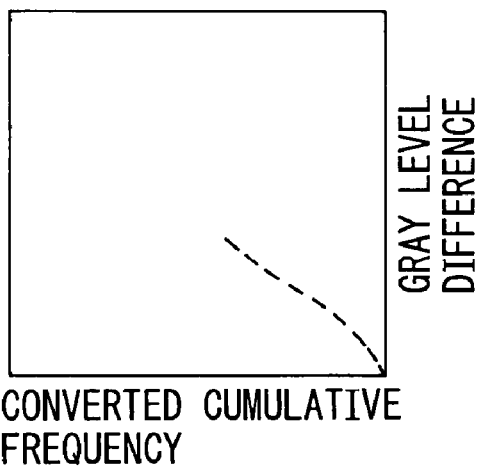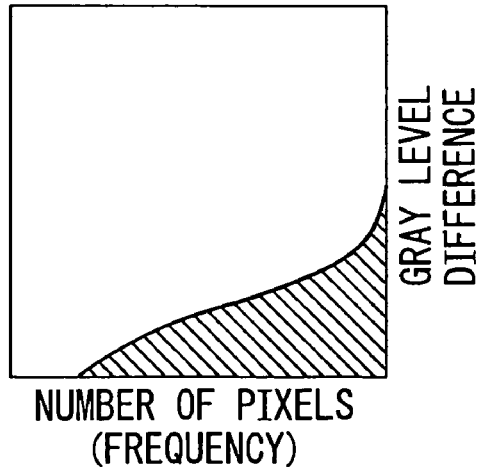

FIG.10
S7
FROM STEP S6
DERIVE APPROXIMATION CURVE — S11
COMPUTE SECOND DERIVATIVE — S12
CORRECT THRESHOLD VALUE DETERMINED IN STEP S6 — S13
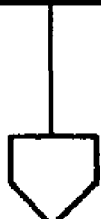
TO OUTPUT OF DETECTION THRESHOLD VALUE

IMAGE DEFECT INSPECTION METHOD, IMAGE DEFECT INSPECTION APPARATUS, AND APPEARANCE INSPECTION APPARATUS

CROSS-REFERENCE TO RELATED APPLICATION

This application claims priority of Japanese Patent Application Number 2005-011420, filed on Jan. 19, 2005.

BACKGROUND OF THE INVENTION

1. Field of the Invention

The present invention relates to a defect inspection method and apparatus which detects a difference between corresponding signals, compares the detected difference with a threshold value, and judges the part under inspection to be defective if the difference is larger than the threshold value. More particularly, the invention relates to an image defect inspection method and apparatus which detects a gray level difference between corresponding portions of two images, compares the detected gray level difference with a threshold value, and judges the part under inspection to be defective if the gray level difference is larger than the threshold value; the invention also relates to an appearance inspection apparatus which, by using such a method, detects a defect in a semiconductor circuit pattern formed on a semiconductor wafer. Still more particularly, the present invention relates to a technique for correcting the above threshold value in accordance with the signals (images).

2. Description of the Related Art

The present invention is directed to an image processing method and apparatus which compares corresponding portions between two images that should be the same, and judges the portion to be defective if the difference is large. The description herein is given by taking as an example an appearance inspection apparatus (inspection machine) for detecting defects in a semiconductor circuit pattern formed on a semiconductor wafer during a semiconductor manufacturing process, but the invention is not limited to this particular type of apparatus. Appearance inspection apparatuses generally used for such applications are bright field inspection apparatuses which illuminate the surface of a sample from a vertical direction and capture the image of its reflected light; however, dark field inspection apparatuses which do not directly capture the illumination light are also used. In the case of the dark field inspection apparatus, the surface of the sample is illuminated from an oblique or a vertical direction, and a sensor is disposed so as not to detect specularly reflected light. Then, the dark field image of the surface of the sample is obtained by sequentially scanning the surface with the illumination light. Accordingly, certain types of dark field apparatuses may not use image sensors, but it will be appreciated that the present invention is also applicable to such apparatuses. In this way, the present invention is applicable to any type of image processing method and apparatus as long as the method and apparatus are designed to compare corresponding portions between two images (signals) that should be the same and to judge the portion to be defective if the difference is large.

In the semiconductor manufacturing process, many chips (dies) are formed on a semiconductor wafer. Patterns are formed in multiple layers on each die. Each completed die is electrically tested using a prober and a tester, and any defective die is removed from the assembly process. In the semiconductor manufacturing process, manufacturing yield is a very important factor, and the result of the electrical testing is fed back to the manufacturing process and used for the management of each process step. However, as the semiconductor manufacturing process consists of many process steps, it takes a very long time before the electrical testing can be conducted after the manufacturing is started. Therefore, when, for example, a certain process step is found faulty as a result of the electrical testing, many wafers are already partway through the process and, thus, the result of the electrical testing cannot be easily utilized for improving the yield. In view of this, pattern defect inspection is performed to inspect formed patterns in the middle of the process in order to detect pattern defects. If the pattern defect inspection is performed at a plurality of steps in the manufacturing process, it becomes possible to detect any defects that occurred after the preceding inspection, and the result of the inspection can thus be promptly reflected in the process management.

In an appearance inspection apparatus currently in use, a semiconductor wafer is illuminated, an electrical image signal is generated by optically capturing an image of a semiconductor circuit pattern, and the electrical image signal is converted into a multi-valued digital signal (digital gray level signal). Then, a difference signal (gray level difference signal) is generated that represents the difference between the gray level signal of the pattern under inspection and the gray level signal of a reference pattern, and any portion where the difference is larger than a predetermined threshold value is judged to be a defect.

Generally, the reference pattern is a die adjacent to the die under inspection or a pattern of the same shape adjacent to the pattern under inspection. Then, defect sorting is performed in which each portion that has been judged to be defective is examined in further detail to determine whether the defect is a true defect that affects the yield. Defect sorting takes a long processing time because each defective portion needs to be examined in detail. Therefore, when judging defects, it is required that any true defect be judged to be a defect without fail, while minimizing the possibility of judging any other defect than a true defect to be a defect.

To achieve this, optimum setting of the threshold value is critical. If the threshold value is set too small, the number of pixels judged to be defective will increase, thus judging even portions not truly defective to be defective, and the resulting problem being that the time required for the defect sorting increases. Conversely, if the threshold value is set too large, even true defects may be judged not to be defects, resulting in the problem of insufficient inspection.

In a prior art method that automatically determines the threshold value according to the sample, the digital gray level signal of the pattern of a similar sample is generated in advance, followed by the generation of a gray level difference signal, and a histogram of gray level differences is constructed. Then, in the histogram, a variable reference difference is obtained which is set as a prescribed percentage of a portion where the gray level difference is large, and the threshold value for detection is determined by adding a fixed difference to the reference difference. This is to prevent the number of pixels judged to be defective from increasing appreciably in cases where the variance of the distribution of the differences is large, by considering that such cases can become a problem in practice. In this method, the variable reference difference varies from sample to sample, but the fixed difference to be added is fixed and does not vary from sample to sample; accordingly, this method has the problem that the proper threshold value cannot be determined when the noise level varies.

To solve this problem, various methods for determining the threshold value have been proposed. For example, Japanese Unexamined Patent Publication No. H04-107946 discloses a method that determines the threshold value based on the statistics of gray level differences computed at a plurality of portions of a pattern. More specifically, a histogram of maximum values is constructed by obtaining the maximum value of the gray level difference for each portion. Then, based on mean and standard deviations, the initial value of the optimum threshold value is set, and the optimum threshold value is determined by correcting the initial value based on the number of pixels detected as defective. This method, however, has the following problems: (1) the sample must be measured in advance and (2) inspection must be performed a plurality of times. Furthermore, while it is stated that the threshold value at which the number of detected defects abruptly changes is optimum, no description is provided of a specific method for obtaining such an optimum threshold value.

On the other hand, Japanese Patent No. 2996263 discloses a method that obtains an approximation curve from the relationship between the gray level difference and its frequency, and that takes the gray level difference at which the approximation curve becomes zero as the optimum threshold value. Here, the relationship between the gray level difference and its frequency is represented by a curve, but a curve does not necessarily become zero; therefore, there are cases where the approximation curve does not become zero. Further, even in the case of a straight line also, the straight line may not become zero, depending on its slope. Therefore, there can occur cases where the threshold value cannot be set. Furthermore, it is stated that the above curve can be obtained easily, but in actuality, this curve cannot be obtained easily because of its dependence on the distribution of gray level differences, and hence there arises the problem that the processing time increases.

Japanese Unexamined Patent Publication No. 2002-22421 discloses a method that performs a conversion to an error probability value by using a standard deviation. This method, however, involves the following problems: (1) as the standard deviation is computed directly from gray level differences, a large amount of computation is required and the processing time increases, and (2) as the error probability value, not the gray level difference, is used to judge the presence or absence of a defect, the error probability value must be computed for every gray level difference, and this again increases the processing time. There is the further problem that, because of the use of the standard deviation, the method is only applicable to a normal distribution and cannot be applied to other types of distribution.

For the inspection of semiconductor patterns, etc., it is desired to automate the inspection process, and it is also desired to automatically set the threshold value. To achieve this, the optimum threshold value must be set by instantly processing the detected gray level difference, and the presence or absence of a defect must be judged based on the threshold value; one possible solution would be to automatically set the threshold value by automatically performing a method such as described above. On the other hand, there is also a need to shorten the inspection time in order to improve throughput, but the above-described methods have such problems as the need to measure the sample a plurality of times in advance, the long processing time, etc. and therefore, are not suited for automating the threshold value setting process in a high-throughput inspection apparatus.

In particular, in the inspection of an actual semiconductor pattern, the noise level differs depending not only on the portion within a die but also on the position of the die on the wafer; furthermore, even when the same semiconductor pattern is formed, the noise level differs from one wafer to another. Therefore, it is required that the optimum threshold value be set by processing the gray level difference as it is detected, but none of the above-described prior art methods can satisfy such a requirement.

In view of the above background, the applicant of this patent application proposed the following image defect inspection method in Japanese Unexamined Patent Publication No. 2004-177397. That is, the distribution (histogram) of the gray level difference between corresponding portions of two images is constructed (see FIG. 1A), and its cumulative frequency is computed (see FIG. 1B). Then, assuming that the gray level difference has a distribution that obeys a prescribed type of distribution, a converted cumulative frequency is computed by converting the cumulative frequency so that the cumulative frequency shows a linear relationship to the gray level difference (see FIG. 1C). After that, an approximation straight line is computed by approximating the converted cumulative frequency by a straight line and, based on the thus computed approximation straight line, the threshold value is determined from a prescribed cumulative frequency value in accordance with a prescribed calculation method.

For example, in the example of FIG. 1C, the threshold value T is calculated as T=(P1−b+VOP)/a+HO, where "a" is the slope of the approximation straight line, "b" is the intercept at which the approximation straight line intersects the vertical axis, P1 is the cumulative frequency corresponding to a prescribed cumulative probability (p), and VOP and HO are prescribed sensitivity setting parameters.

As the converted cumulative frequency computed by this method shows a linear relationship to the gray level difference, subsequent processing for determining the threshold value is facilitated and, as a result, the threshold value can be set, automatically, in a short processing time.

SUMMARY OF THE INVENTION

However, the method disclosed in the above cited Japanese Unexamined Patent Publication No. 2004-177397 has had the problem that, if the distribution of the gray level difference of the electrical image signal greatly differs from the prescribed type of distribution assumed when computing the converted cumulative frequency, the converted cumulative frequency thus computed does not become linear, and there arises the possibility that the threshold value may be set excessively large or excessively small. This will be explained with reference to FIGS. 2A and 2B.

FIG. 2A is a diagram showing the converted cumulative frequency which does not become linear with respect to the gray level difference because the distribution of the gray level difference greatly differs from the prescribed type of distribution assumed when computing the converted cumulative frequency. In the example shown in FIG. 2A, the converted cumulative frequency describes a curve that opens upward. FIG. 2B shows how the threshold value is determined based on the thus computed converted cumulative frequency by obtaining the approximation straight line as in the method disclosed in the above cited Japanese Unexamined Patent Publication No. 2004-177397.

As shown in FIG. 2B, in the region where the gray level difference is large, the converted cumulative frequency corresponding to the determined threshold value becomes larger than the expected frequency, because the rate of increase of the converted cumulative frequency increases in that region. This means that the number of pixels to be detected as defective becomes excessively small, that is, the detection sensitivity drops because the threshold value is set too high.

The phenomenon of the non-linear conversion of the converted cumulative frequency occurs, for example, when there is a difference in average brightness (so-called "color variation") between the two images for which the gray level difference was computed.

In view of the above problem, it is an object of the present invention to provide an image defect inspection method and apparatus which detects a gray level difference between corresponding portions of two images, automatically sets a threshold value based on the distribution of the detected gray level difference, compares the detected gray level difference with the threshold value, and judges the part under inspection to be defective if the gray level difference is larger than the threshold value, wherein provisions are made to perform the defect inspection with proper sensitivity by correcting the automatically set threshold value when the distribution of the gray level difference of the image under inspection is different from the usual distribution.

To achieve the above object, the present invention corrects the threshold value in accordance with the second derivative of the converted cumulative frequency with respect to the gray level difference.

That is, in the image defect inspection method and image defect inspection apparatus according to the present invention, the cumulative frequency of the gray level difference between two images is computed and, assuming that the gray level difference has a distribution that obeys a prescribed type of distribution, a converted cumulative frequency is computed by converting the cumulative frequency so that the cumulative frequency shows a linear relationship to the gray level difference; then, an approximation curve of the converted cumulative frequency is derived, and the threshold value is corrected in accordance with the second derivative of the approximation curve with respect to the gray level difference.

For the second derivative of the converted cumulative frequency used to correct the threshold value, an approximation function is derived, for example, by approximating the converted cumulative frequency by a prescribed function, and the second derivative of the approximation function with respect to the gray level difference is used to correct the threshold value. Such an approximation function can be derived, for example, as a quadratic function of the gray level difference.

In a further alternative embodiment, each of a plurality of segments of the converted cumulative frequency is approximated by a straight line, thereby deriving approximation straight lines for the respective segments, and the threshold value is corrected in accordance with the difference between the slopes of the approximation straight lines.

In this case, the converted cumulative frequency may be divided into a region where the gray level difference is larger than a prescribed value and a region where it is smaller than the prescribed value, and the approximation straight lines may be derived for the respective regions; alternatively, the converted cumulative frequency may be divided into a region where the converted cumulative frequency is larger than a prescribed value and a region where it is smaller than the prescribed value, and the approximation straight lines may be derived for the respective regions.

BRIEF DESCRIPTION OF THE DRAWINGS

These and other objects and features of the present invention will become clearer from the following description of the preferred embodiments given with reference to the attached drawings, wherein:

FIG. 3 is a block diagram showing the general configuration of an appearance inspection apparatus according to an embodiment of the present invention;

FIGS. 7A to 7C are diagrams for explaining the process for determining the detection threshold value;

FIG. 10 is a flowchart illustrating a threshold value correction routine (step S7 in FIG. 6) which is executed by the detection threshold value calculation section shown in FIG. 5;

DESCRIPTION OF THE PREFERRED EMBODIMENTS

Preferred embodiments of the present invention will be described in detail below while referring to the attached drawings.

FIG. 3 is a block diagram showing the general configuration of a semiconductor pattern appearance inspection apparatus according to a first embodiment of the present invention. As shown, a sample holder (chuck stage) 2 is installed on the upper surface of a stage 1 which is freely movable in two- or three-dimensional directions. A semiconductor wafer 3 to be inspected is mounted and held fixed onto the sample holder 2. An imaging device 4 comprising a one-dimensional or a two-dimensional CCD camera or the like is disposed above the stage, and the imaging device 4 generates an image signal by capturing an image of a pattern formed on the semiconductor wafer 3.

Figure 1A:
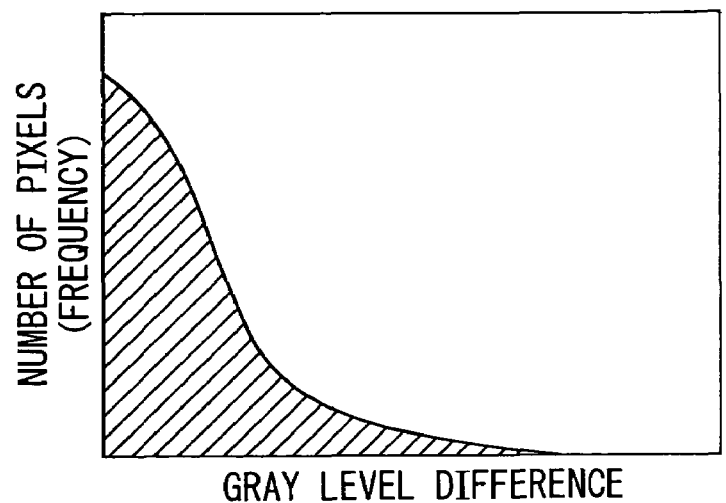
FIGS. 1A to 1C are diagrams for explaining a prior art image defect inspection method.
Figure 1B:
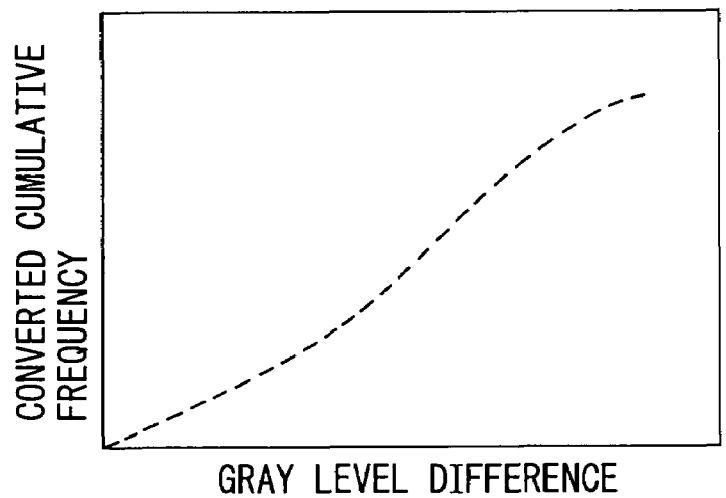
Figure 1C:
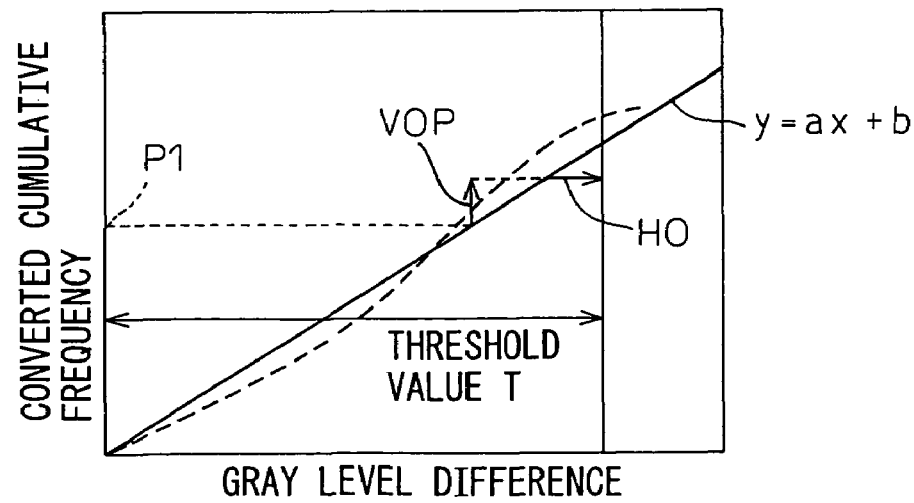
Figure 2A:
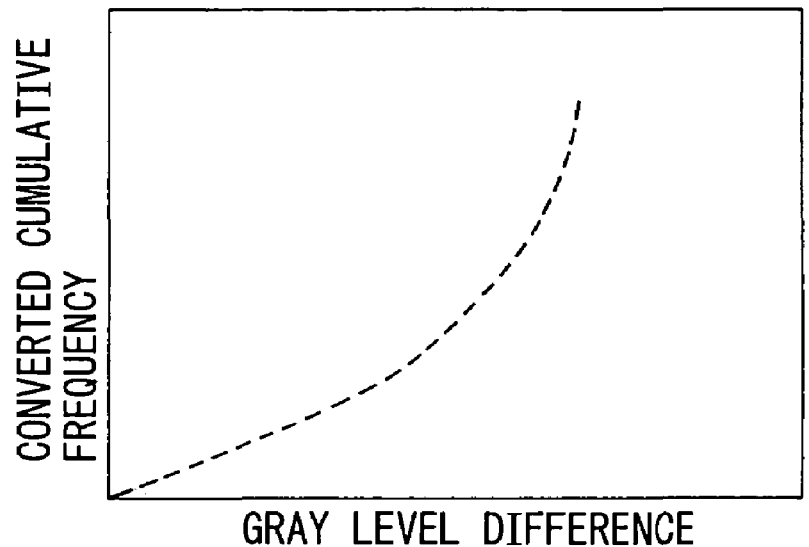
FIGS. 2A and 2B are diagrams for explaining the effect that a variation in a gray level difference distribution will have on a detection threshold value.
Figure 2B:
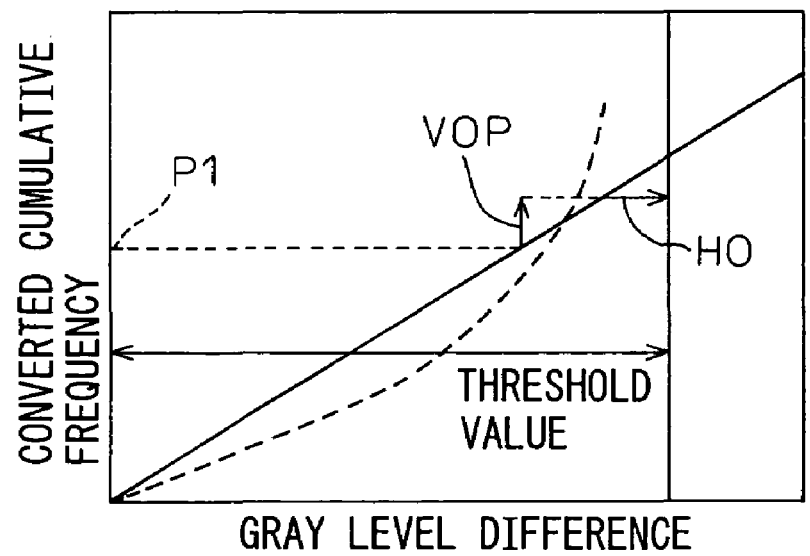
Figure 4:
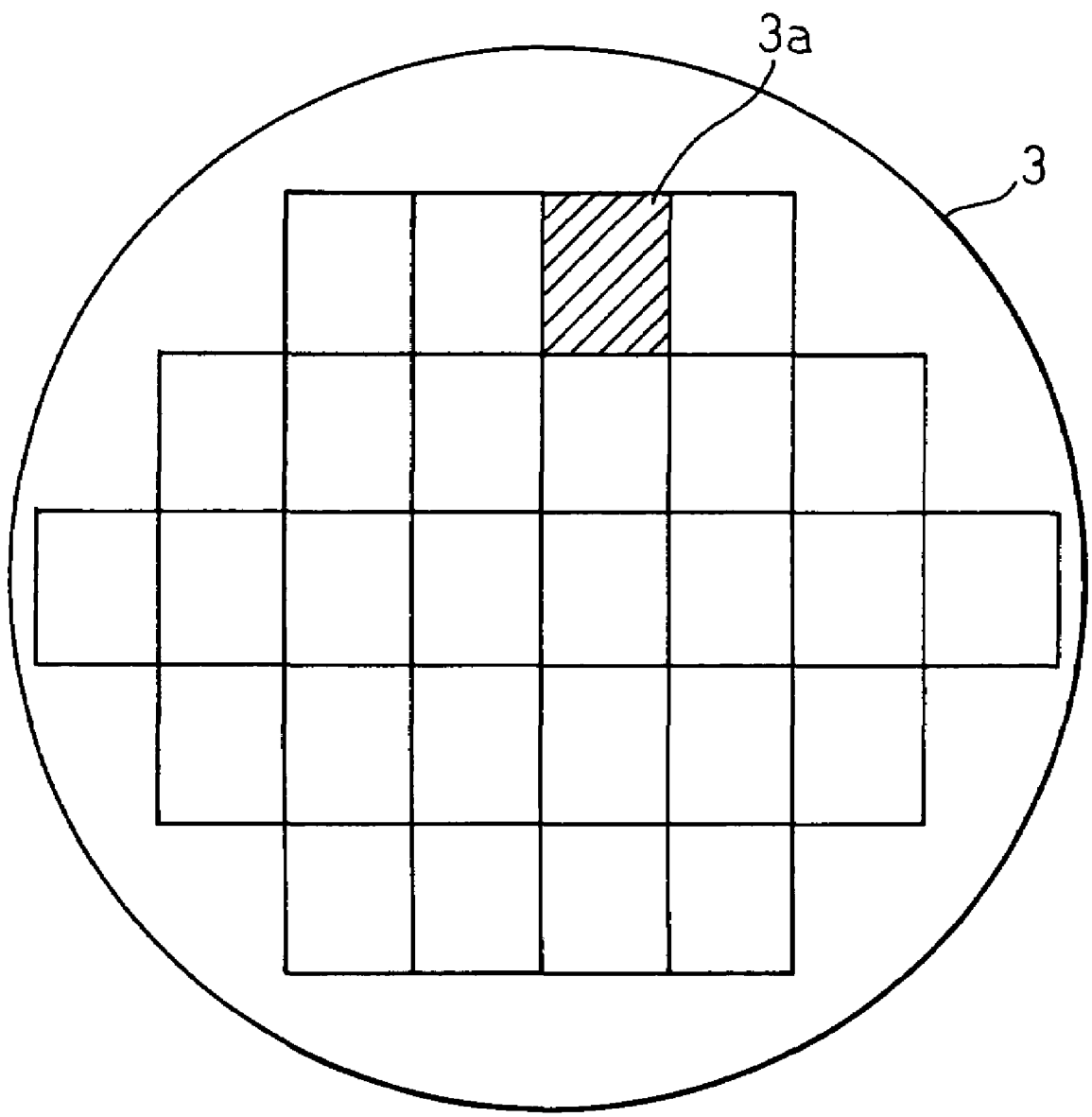
FIG. 4 is a diagram showing an arrangement of dies on a semiconductor wafer.

As shown in FIG. 4, a plurality of dies 3a are formed on the semiconductor wafer 3 in a matrix pattern repeating in X and Y directions. As the same pattern is formed on each die, it is general practice to compare the images of corresponding portions between adjacent dies. If there is no defect in any of the two adjacent dies, the gray level difference between them is smaller than a threshold value, but if there is a defect in either one of the dies, the gray level difference is larger than the threshold value (single detection). At this stage, however, this is no knowing which die contains the defect; therefore, the die is further compared with a die adjacent on a different side and, if the gray level difference in the same portion is larger than the threshold value, then it is determined that the die under inspection contains the defect (double detection).

Here, the imaging device 4 is constructed from a one-dimensional CCD camera, and the stage 1 is moved so that the camera moves (scans) at a constant speed in the X or Y direction relative to the semiconductor wafer 3. The image signal is converted into a multi-valued digital signal (gray level signal) which is then supplied to a difference detection section 6 and also to a signal storage section 5 for storing therein. As the scanning proceeds, a gray level signal is generated from the adjacent die, in synchronism with which the gray level signal of the preceding die is read out of the signal storage section 5 and supplied to the difference detection section 6. Actually, processing such as fine registration is also performed, but a detailed description of such processing will not be given here.

In this way, the gray level signals of the two adjacent dies are input to the difference detection section 6 which then computes the difference (gray level difference) between the two gray level signals and supplies it to a detection threshold value calculation section 7 and a detection section 8. Here, the difference detection section 6 computes the absolute value of the gray level difference and outputs it as the gray level difference. The detection threshold value calculation section 7 determines the detection threshold value based on the gray level difference and supplies it to the detection section 8. The detection section 8 compares the gray level difference with the thus determined threshold value to determine whether there exists a defect. Generally, the noise level of a semiconductor pattern differs depending on the kind of the pattern such as the pattern of a memory cell portion, the pattern of a logic circuit portion, the pattern of a wiring portion, or the pattern of an analog circuit portion. Correspondence between each portion and the kind of the semiconductor pattern can be found from the design data. Therefore, the detection threshold value calculation section 7, for example, determines the threshold value by performing threshold value determining processing for each portion, and the detection section 8 makes the determination by using the threshold value determined for each portion.

In the present embodiment, the signal storage section 5 is provided in order to compare the images of adjacent dies on the semiconductor wafer, but the gray level difference can also be generated by supplying to the difference detection section 6 the image signal of a reference sample separately stored or an image signal generated from data such as CAD; in that case, the signal storage section 5 can be omitted.

The general configuration of the appearance inspection apparatus according to the embodiment of the present invention has been described above, but it should be noted that the feature of the present invention lies in the detection threshold value calculation section 7, a first configuration example of which will be described with reference to the block diagram of FIG. 5.

Figure 5:
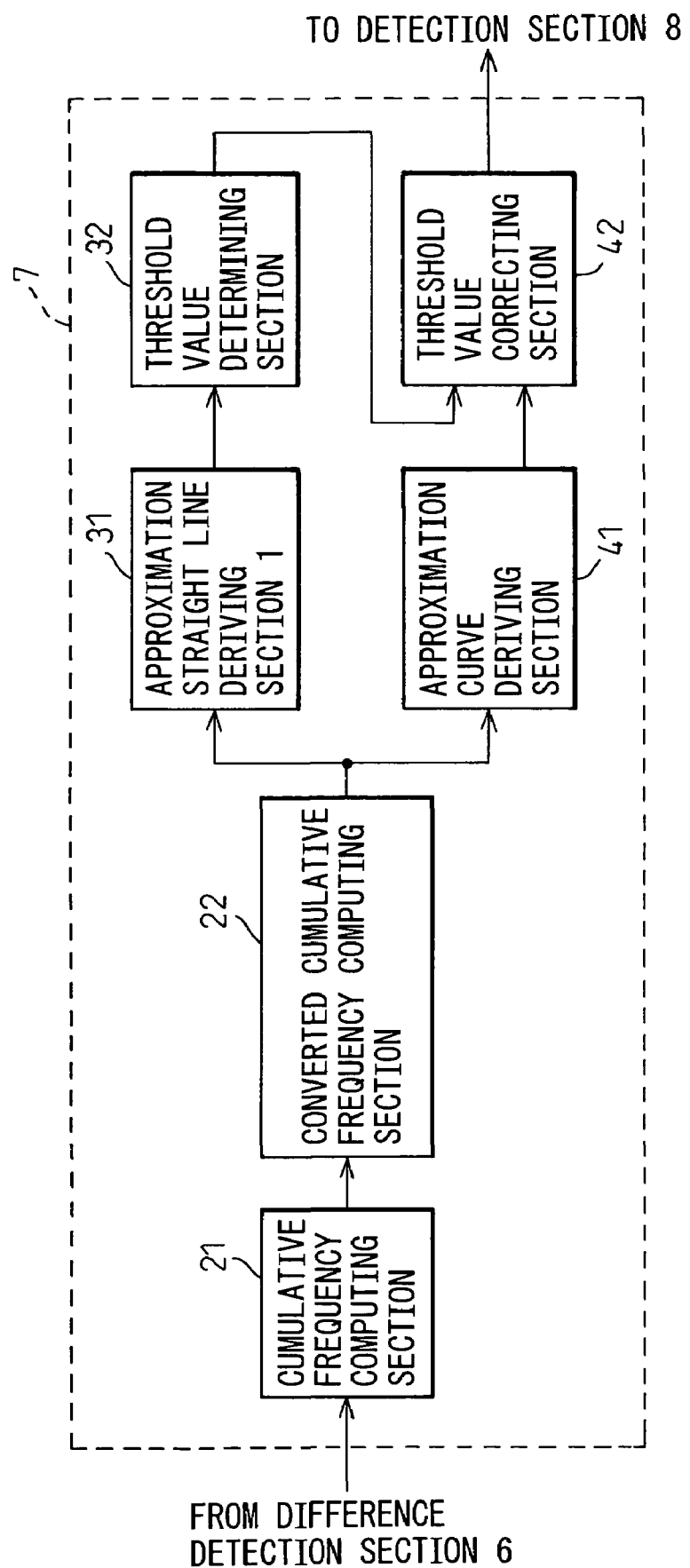
FIG. 5 is a block diagram showing a first configuration example of a detection threshold value calculation section.

FIG. 5 is a block diagram showing the first configuration example of the detection threshold value calculation section 7.

As shown, the detection threshold value calculation section 7 comprises: a cumulative frequency computing section 21 which takes as an input the gray level difference supplied from the difference detection section 6, and computes its cumulative frequency; a converted cumulative frequency computing section 22 which takes the cumulative frequency as an input, and computes a converted cumulative frequency by converting the cumulative frequency so that the cumulative frequency shows a linear relationship to the gray level difference; a first approximation straight line computing section 31 which computes an approximation straight line by approximating the entirety of the converted cumulative frequency by a straight line; and a threshold value determining section 32 which determines, based on the approximation straight line, the threshold value from a prescribed cumulative frequency value in accordance with a prescribed calculation method.

The detection threshold value calculation section 7 further comprises: an approximation curve deriving section 41 which takes as an input the converted cumulative frequency supplied from the converted cumulative frequency computing section 22, and derives its approximation curve; and a threshold value correcting section 42 which computes the second derivative of the approximation curve with respect to the gray level difference and, based on this second derivative, corrects the threshold value determined by the threshold value determining section 32.

The component elements of the detection threshold value calculation section 7 described above may be implemented as individual hardware circuits for carrying out the respective functions; alternatively, the entire detection threshold value calculation section 7 may be constructed from a computer means, and the above component elements may be implemented as individual software modules for carrying out the respective functions.

The operation of the thus configured detection threshold value calculation section 7 and its component elements will be described with reference to FIGS. 6, 7A to 7C, 8A to 8C, 9A and 9B, 10, 11A to 11C, and 12A to 12C.

Figure 6:
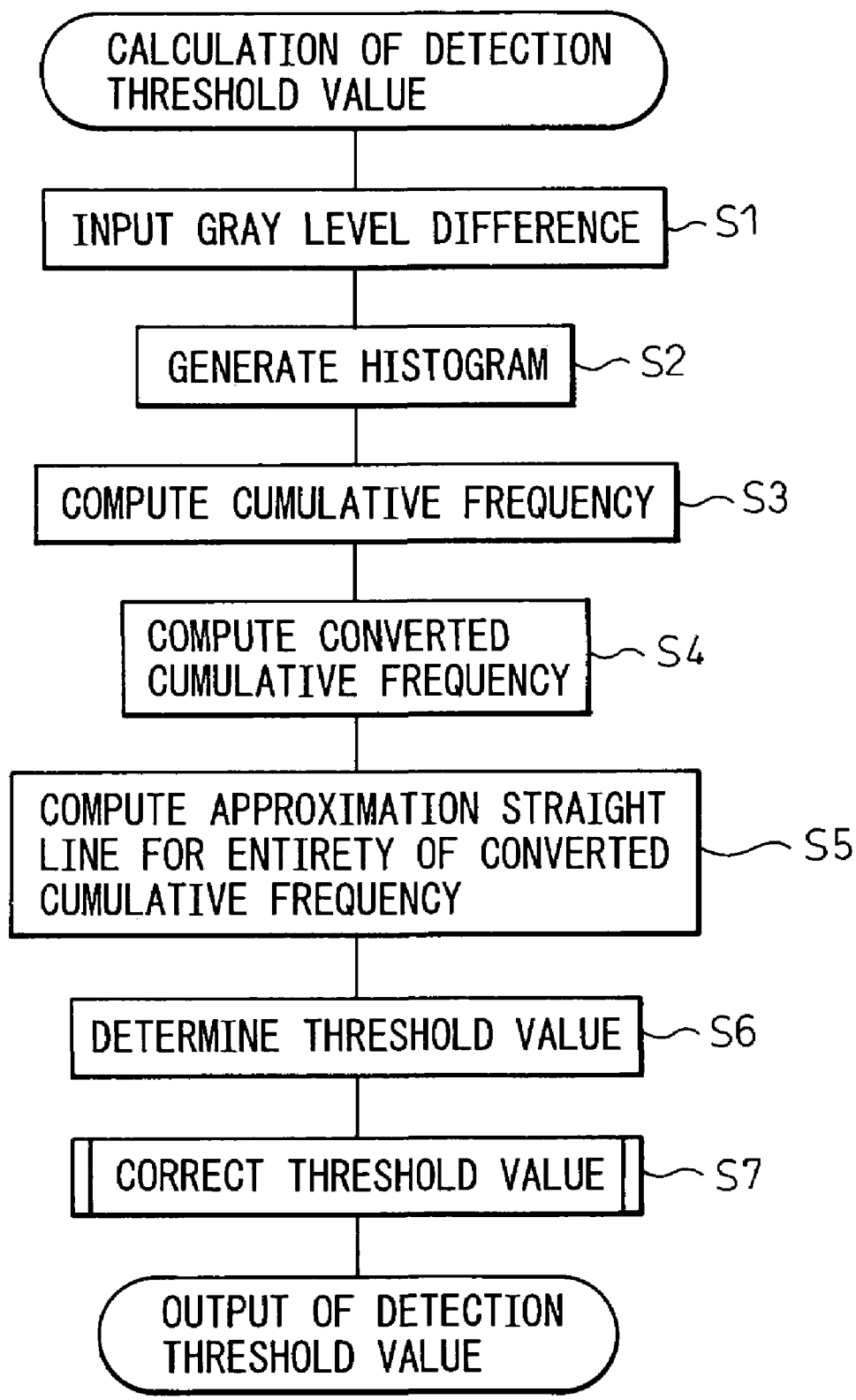
FIG. 6 is a general flowchart illustrating the detection threshold value calculation process performed in the detection threshold value calculation section.

FIG. 6 is a general flowchart illustrating the detection threshold value calculation process performed in the detection threshold value calculation section 7 in FIG. 5. In the flowchart shown in FIG. 6, the detection threshold value is determined in steps S1 to S6, and the detection threshold value is corrected in the subsequent step S7. The following description first deals with the procedure for determining the detection threshold value in steps S1 to S6. FIGS. 7A to 7C show the graphs generated during the detection threshold value determining process.

In step S1, the gray level difference calculated pixel by pixel by the difference detection section 6 in FIG. 3 is input to the cumulative frequency computing section 11 in FIG. 5. In step S2, the cumulative frequency computing section 21 generates a histogram of gray level differences such as shown in FIG. 7A. Here, if the number of pixels under inspection is large, the histogram need not necessarily be generated by using the gray level differences of all the pixels, but may be generated by using the gray level differences only of selectively sampled pixels.

In step S3, the cumulative frequency computing section 21 computes the cumulative frequency of the gray level difference based on the histogram. Here, instead of computing the cumulative frequency, a cumulative probability may be created.

In step S4, assuming that the gray level difference obeys a certain type of distribution, the converted cumulative frequency computing section 22 converts the cumulative frequency so that the cumulative frequency shows a linear relationship to the gray level difference in the assumed distribution. Here, the converted cumulative frequency computing section 22 may assume that the gray level difference obeys a certain type of distribution such as a normal distribution, a Poisson distribution, or a chi-squared distribution.

Figure 8C:
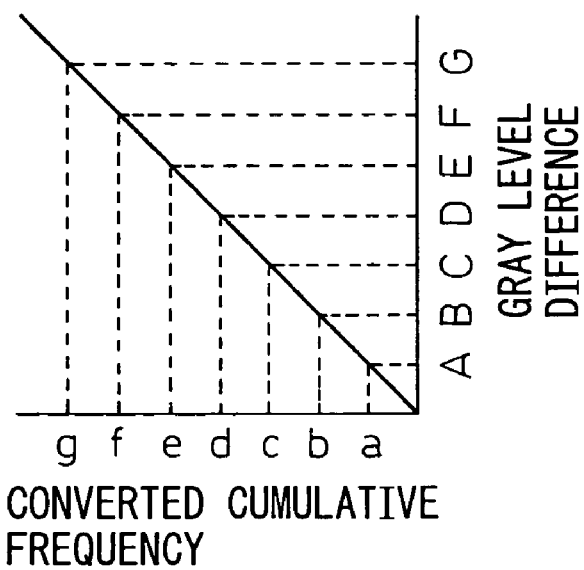
FIGS. 8A to 8C are diagrams for explaining the process for computing a converted cumulative frequency.
Figure 8B:
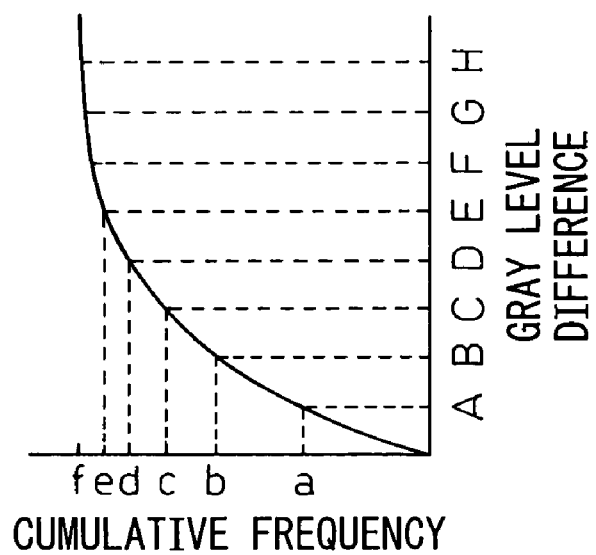
Figure 8A:
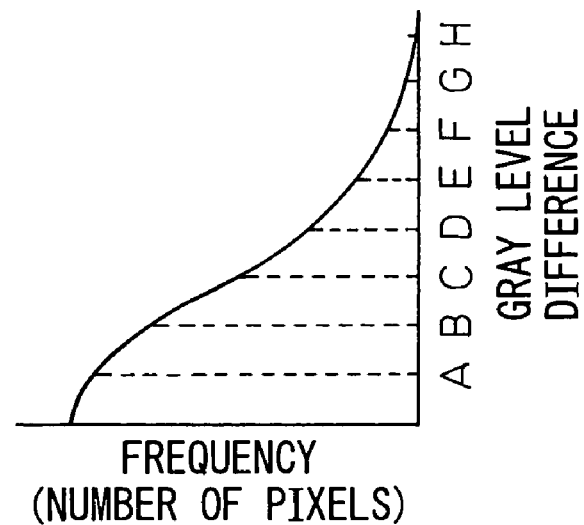

It is assumed that the frequency of the gray level difference has a certain distribution such as shown in FIG. 8A. Then, its cumulative frequency is a monotonically increasing curve such as shown in FIG. 8B. If the curve is represented by probabilities by dividing each cumulative frequency by the total number of samples, curves having the same coefficient, which shows how widespread the distribution is, are identical. Next, the cumulative frequency is converted so that the cumulative frequency shows a linear relationship to the gray level difference. To describe more specifically, if "a" to "f" in FIG. 8B (actually "a" to "h", though not shown here) are converted so that they are proportional to A to F (A to H), the graph shown in FIG. 8C results; here, if A to G (A to H) are equally spaced apart, then "a" to "g" ("a" to "h") are also equally spaced apart. The cumulative frequency thus converted will be referred to as the converted cumulative frequency. To describe this process more specifically, if the probability of the gray level difference is denoted by f(t), the cumulative probability F(t) (cumulative frequency/number of samples) is expressed by the following equation.

$$F(t)=\int_{-\infty}^{t}f(x)dx$$

Then, the cumulative probability is converted into the converted cumulative frequency by using the inverse function $F^{-1}(t)$ of the cumulative probability F(t). The converted cumulative frequency thus obtained is represented by a graph close to a straight line as shown in FIG. 7B. In the figure, the graph is shown in terms of cumulative frequency, but the graph is the same if it is shown in terms of cumulative probability.

Since the computation for obtaining the inverse function of the cumulative probability requires a large amount of computation, the conversion is performed by using a conversion table constructed in advance in accordance with the distribution. Further, the conversion need not be performed on all the cumulative frequency points, but need only be performed on the points necessary to obtain the approximation straight line hereinafter described. The assumed distribution can be created in advance by using a reference sample or a portion of the sample. As for the method of creating the assumed distribution from the reference, a histogram of gray level differences is generated covering a region sufficiently larger than the range within which the threshold value is obtained in the inspection. In this case, a die free from color variation and other imperfections or an area containing such dies is selected, or the average value of the signed gray level differences is obtained and a correction is made so that the gray level difference becomes zero at the average value, or a correction is made so that the gray level difference becomes zero when the probability is 50%. Then, the absolute value of the gray level difference is obtained by folding the corrected value at zero. After that, the conversion table is constructed by obtaining the cumulative probability for each of the equally spaced gray level differences.

In step S5, the first approximation straight line deriving section 31 derives the approximation straight line (y=ax+b) from the relationship between the gray level difference and the converted cumulative frequency. Here, the approximation straight line can be obtained using a least squares method or the like, but can also be obtained in a simpler manner by joining a certain point on the converted cumulative frequency to the origin by a straight line.

In step S6, the threshold value is determined based on the parameters "a" and "b" of the approximation straight line and on the sensitivity setting parameters (fixed values).

Figure 9A:
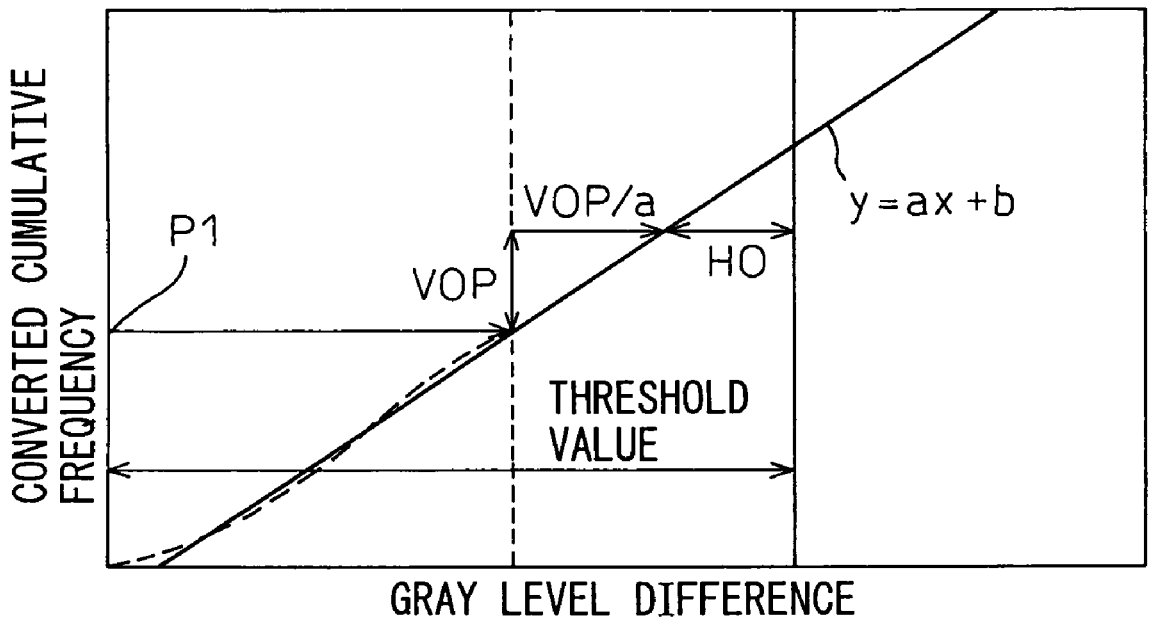
FIGS. 9A and 9B are diagrams for explaining the process for determining the threshold value by using a graph showing the relationship between the gray level difference and the converted cumulative frequency.
Figure 9B:
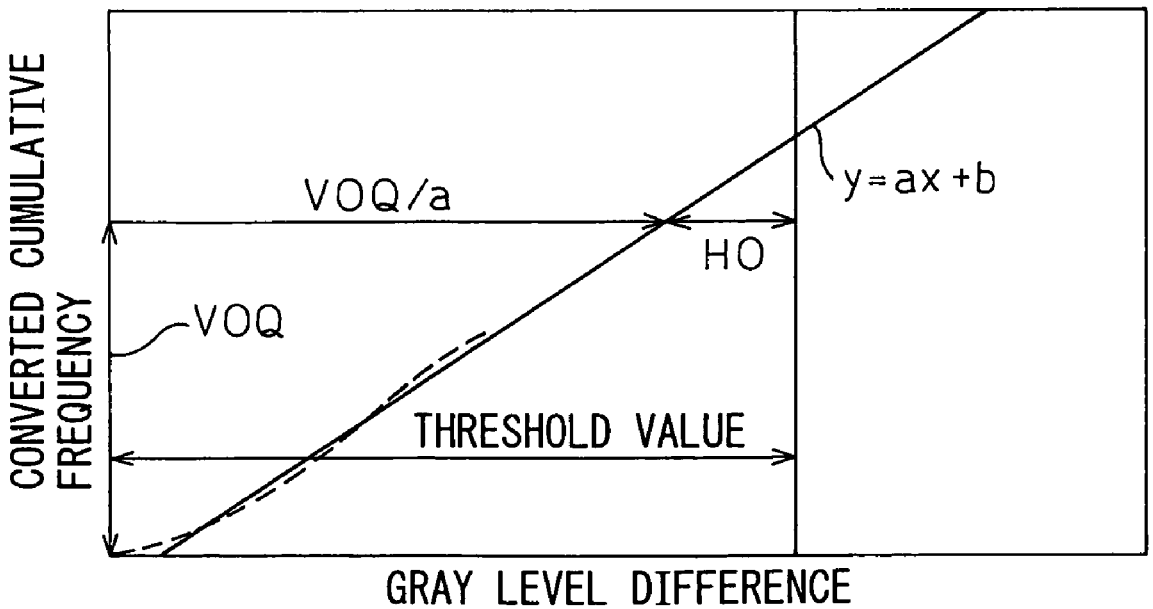

FIGS. 9A and 9B are diagrams for explaining an example of a method for determining the threshold value. In FIG. 9A which shows a graph plotting the converted cumulative frequency against the gray level difference, VOP and HO are set as the fixed sensitivity setting parameters, and the point on the straight line is obtained that represents the cumulative frequency P1 corresponding to a certain cumulative probability (p) (P1 is obtained by multiplying p by the number of samples); then, the gray level difference, obtained by moving that point by VOP in the vertical axis direction and by HO in the horizontal axis direction, is taken as the threshold value. Accordingly, the threshold value T is expressed as T=(P1−b+VOP)/(a+HO).

The same result can be obtained by setting P1+VOP as VOQ and taking T=(VOQ−b)/(a+HO) as the threshold value, as shown in FIG. 9B.

The threshold value correction process performed in step S7 of FIG. 6 will be described below with reference to FIGS. 10, 11A to 11C, and 12A to 12C. FIG. 10 is a flowchart illustrating the threshold value correction routine shown in step S7 of FIG. 6, and FIGS. 11A to 11C and 12A to 12C are diagrams for explaining examples of the threshold value correction method.

In step S4 of FIG. 6, the converted cumulative frequency computing section 22 in FIG. 5 computes the converted cumulative frequency; on the other hand, in step S11 of FIG. 10, the approximation curve deriving section 41 derives the approximation curve of the converted cumulative frequency. Here, when the converted cumulative frequency computing section 22 is configured to perform the conversion, not on all the cumulative frequency points, but on only discrete sample points, as previously described, the approximation curve deriving section 41 derives the approximation curve of the converted cumulative frequency based on the discrete sample points. How this is done is shown in FIGS. 11A and 11B.

Figure 11A:
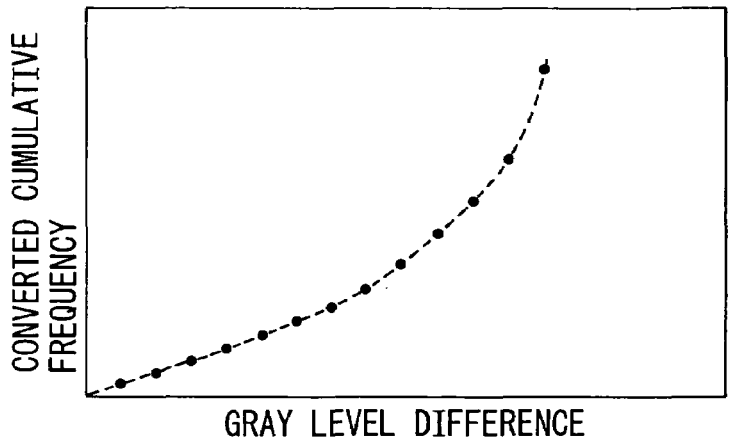
FIGS. 11A to 11C are diagrams (part 1) for explaining an example of a method for correcting the threshold value based on an approximation curve of the converted cumulative frequency.
Figure 11B:
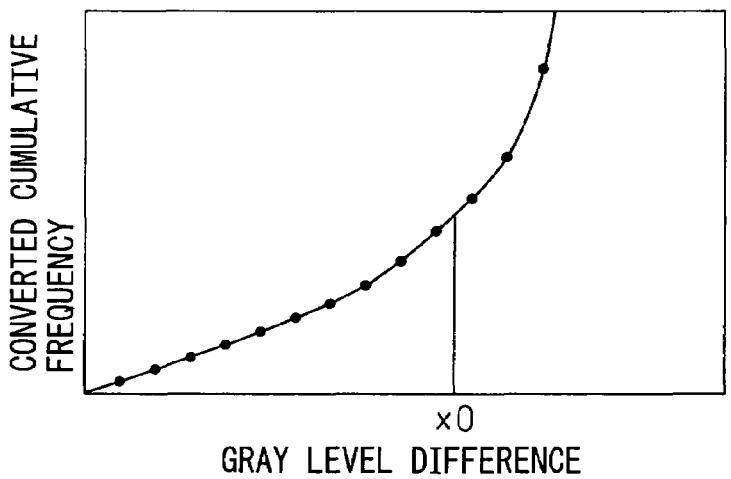

FIG. 11A shows a plot of the discrete sample points of the converted cumulative frequency obtained by the converted cumulative frequency computing section 22, and the solid line shown in FIG. 11B indicates the approximation curve of the converted cumulative frequency that the approximation curve deriving section 41 derives. Various known interpolation techniques such as spline interpolation and Lagrange's interpolation can be used for the approximation curve deriving section 41 to derive the approximation curve. The approximation curve deriving section 41 supplies the thus derived approximation curve (in a specific example, position information of each point on the approximated curve or various parameters of a function that expresses the approximation curve) to the threshold value correcting section 42 at the subsequent stage.

After that, in step S12, the threshold value correcting section 42 shown in FIG. 5 computes the second derivative $$\frac{d^2 y}{dx^2}$$

x: GRAY LEVEL DIFFERENCE y: CONVERTED CUMULATIVE FREQUENCY taken with respect to the gray level difference, of the approximation curve of the converted cumulative frequency that the approximation curve deriving section 41 derived. Here, the second derivative at the gray level difference x0 corresponding to a prescribed converted cumulative frequency p0 in a set of the derived converted cumulative frequencies may be taken as the above second derivative, or the second derivative at a prescribed gray level difference x0 may be computed; alternatively, the second derivative that is the largest among all the converted cumulative frequency points may be computed, or the average of the second derivatives of all the converted cumulative frequency points or a plurality of converted cumulative frequency points may be taken as the above second derivative.

Then, in step S13, the threshold value determined by the threshold value determining section 32 in the above step S6 is corrected by the threshold value correcting section 42 based on the thus computed second derivative in accordance with the following equation.

CORRECTED THRESHOLD VALUE =

$$\text{ORIGINAL THRESHOLD VALUE} + h1\left(\frac{d^2 y}{dx^2}\right)$$

Figure 11C:
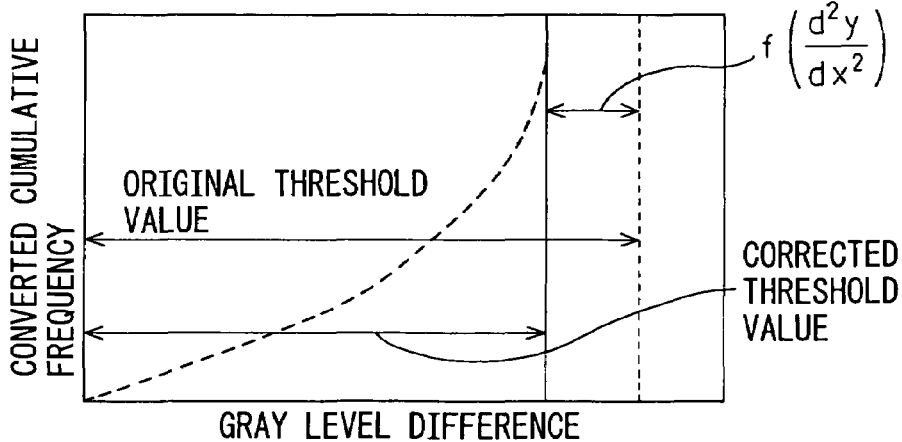

Here, a monotonic decreasing function which basically has a monotonically decreasing relationship with respect to the above computed second derivative is employed as the function h1(x). When such a function h1(x) is employed, then when the converted cumulative frequency is a function that opens upward (that is, the second derivative is positive), for example, as shown in FIG. 11C, the correction is made so that the corrected threshold value becomes smaller than the original threshold value. This serves to prevent the defect inspection sensitivity from dropping due to abnormality in the gray level difference distribution.

Figure 12A:
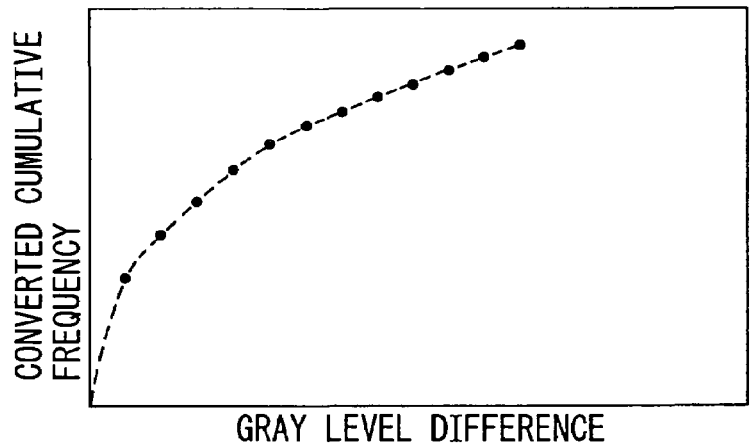
FIGS. 12A to 12C are diagrams (part 2) for explaining an example of a method for correcting the threshold value based on an approximation curve of the converted cumulative frequency.
Figure 12B:
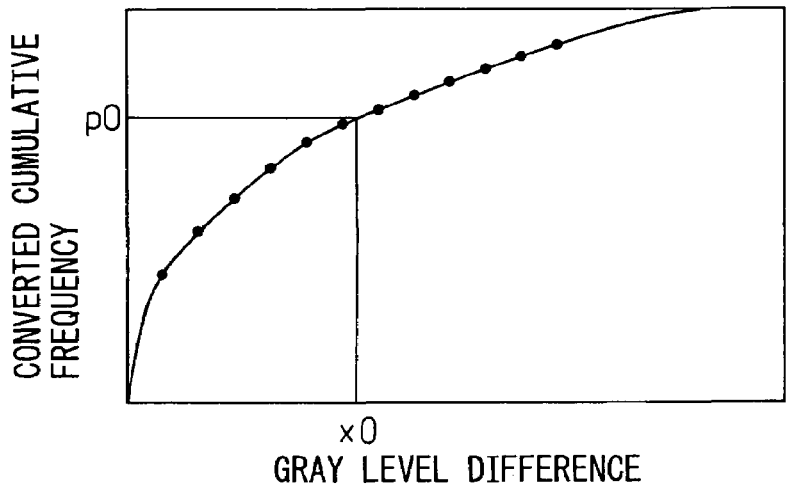
Figure 12C:
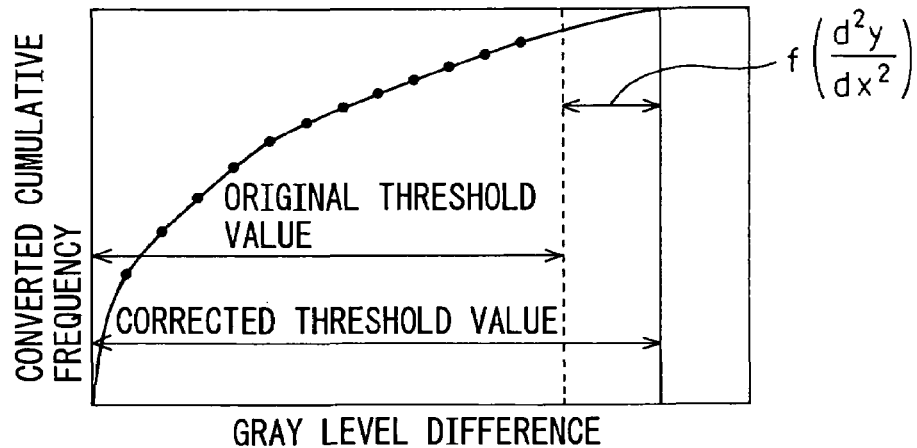

FIGS. 12A to 12C show an example in which the converted cumulative frequency is a function that opens downward. In this case, as the rate of increase of the converted cumulative frequency decreases in the region where the gray level difference is large, the converted cumulative frequency corresponding to the determined threshold value becomes smaller than the expected frequency. This means that the number of pixels to be detected as defective becomes excessively large, that is, false defects occur because the threshold value is set too low.

According to the present invention, when the converted cumulative frequency is a function that opens downward (that is, the second derivative is negative), for example, as shown in FIG. 12C, the correction is made so that the corrected threshold value becomes larger than the original threshold value. This serves to prevent the occurrence of false defects.

Figure 13:
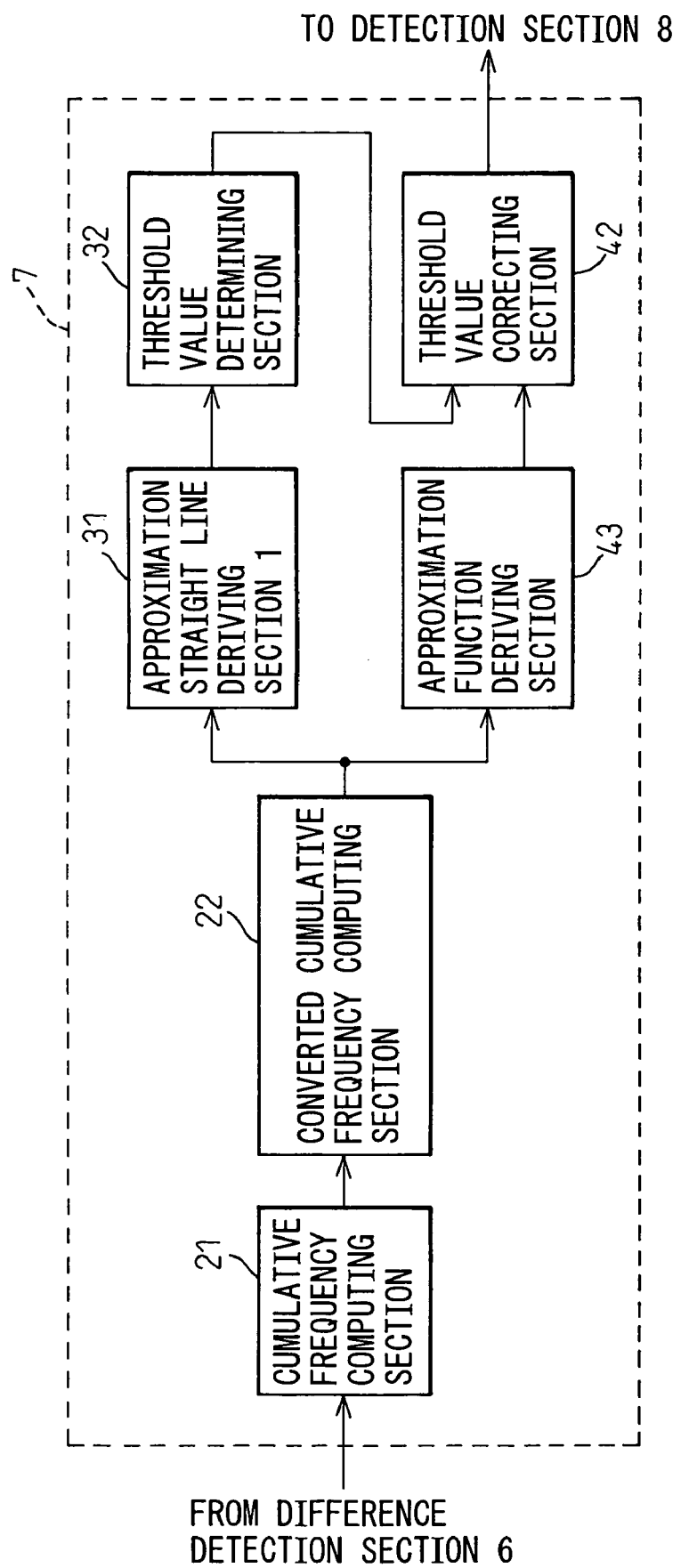
FIG. 13 is a block diagram showing a second configuration example of the detection threshold value calculation section.

FIG. 13 is a block diagram showing a second configuration example of the detection threshold value calculation section 7 of the appearance inspection apparatus shown in FIG. 3. In this configuration example, the detection threshold value calculation section 7 includes an approximation function deriving section 43 which derives an approximation function in which the converted cumulative frequency obtained by the converted cumulative frequency computing section 22 is approximated by a prescribed function.

Figure 14:
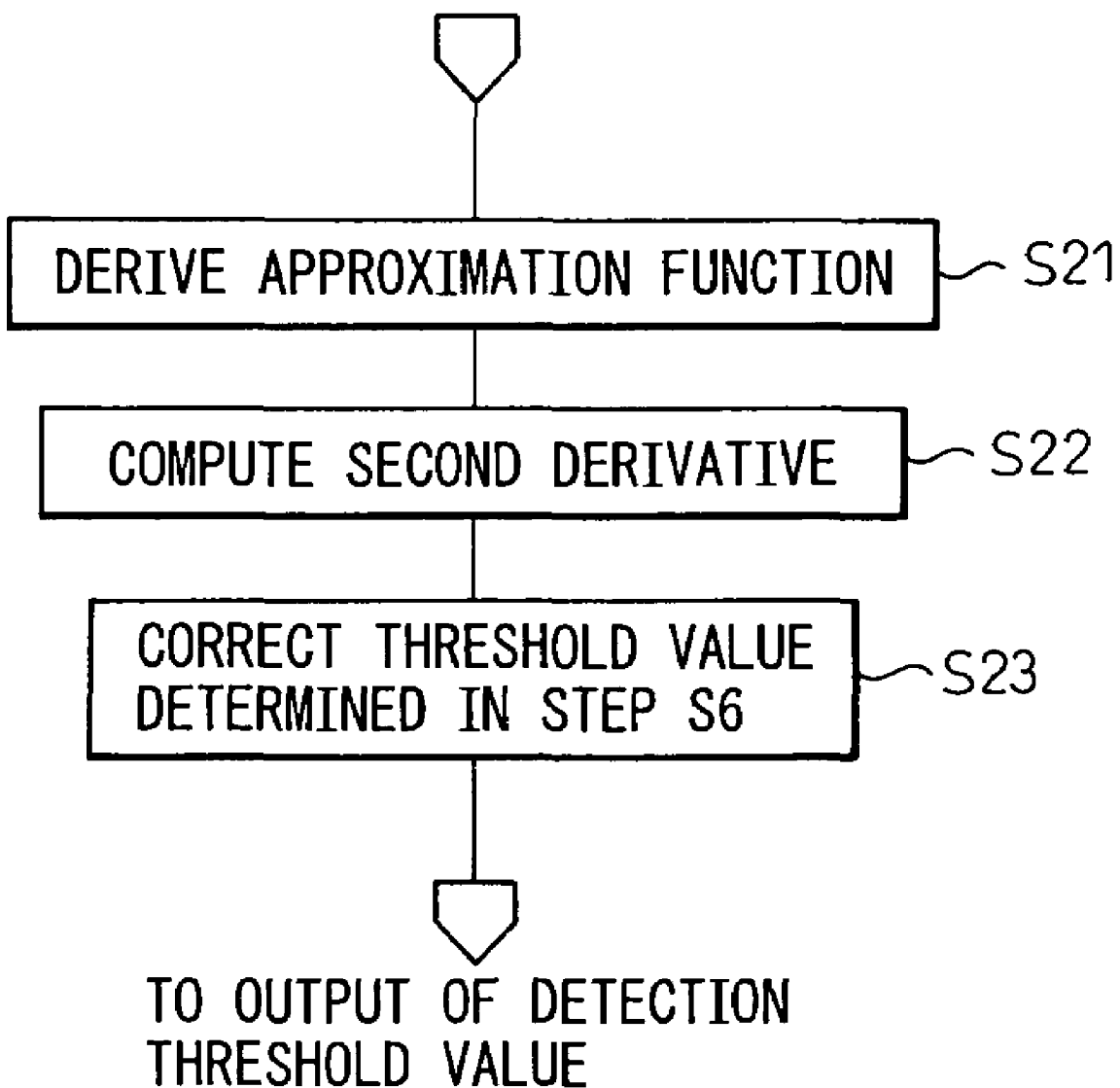
FIG. 14 is a flowchart illustrating a threshold value correction routine (step S7 in FIG. 6) which is executed by the detection threshold value calculation section shown in FIG. 13.

FIG. 14 is a flowchart illustrating the threshold value correction routine (step S7 in FIG. 6) which is executed by the detection threshold value calculation section 7 shown in FIG. 13. In step S21 of FIG. 14, the approximation function deriving section 43 derives the approximation function of the converted cumulative frequency. For the approximation function that the approximation function deriving section 43 derives, various known approximation functions such as a high-order polynomial in gray level difference x can be used, and various known approximation methods such as spline interpolation, Lagrange's interpolation, least squares method, and Tchebyshev approximation can be used as the method of approximation. In the case where the approximation is done using, for example, the quadratic function $$y = Ax^2 + Bx + C$$

where x is the gray level difference and y the converted cumulative frequency, the approximation function deriving section 43 supplies the derived approximation function, or more specifically the various parameters (in the example of the above quadratic function, the constants A, B, and C) defining the approximation function, to the threshold value correcting section 42 at the subsequent stage.

After that, in step S22, the threshold value correcting section 42 shown in FIG. 5 computes the second derivative with respect to the gray level difference, of the approximation function of the converted cumulative frequency that the approximation function deriving section 43 derived.

Then, in step S23, the threshold value determined by the threshold value determining section 32 in the above step S6 is corrected by the threshold value correcting section 42 in accordance with the above computed second derivative. In the example of the above quadratic function, Corrected threshold value=Original threshold value+
h2(A)

Here, a monotonic decreasing function which basically has a monotonically decreasing relationship with respect to x is employed as the function h2(X). In the example of the above quadratic function, the approximation function deriving section 43 may simply supply only the constant A to the threshold value correcting section 42 at the subsequent stage, and the threshold value correcting section 42 may correct the threshold value in accordance with the constant A.

Figure 15:
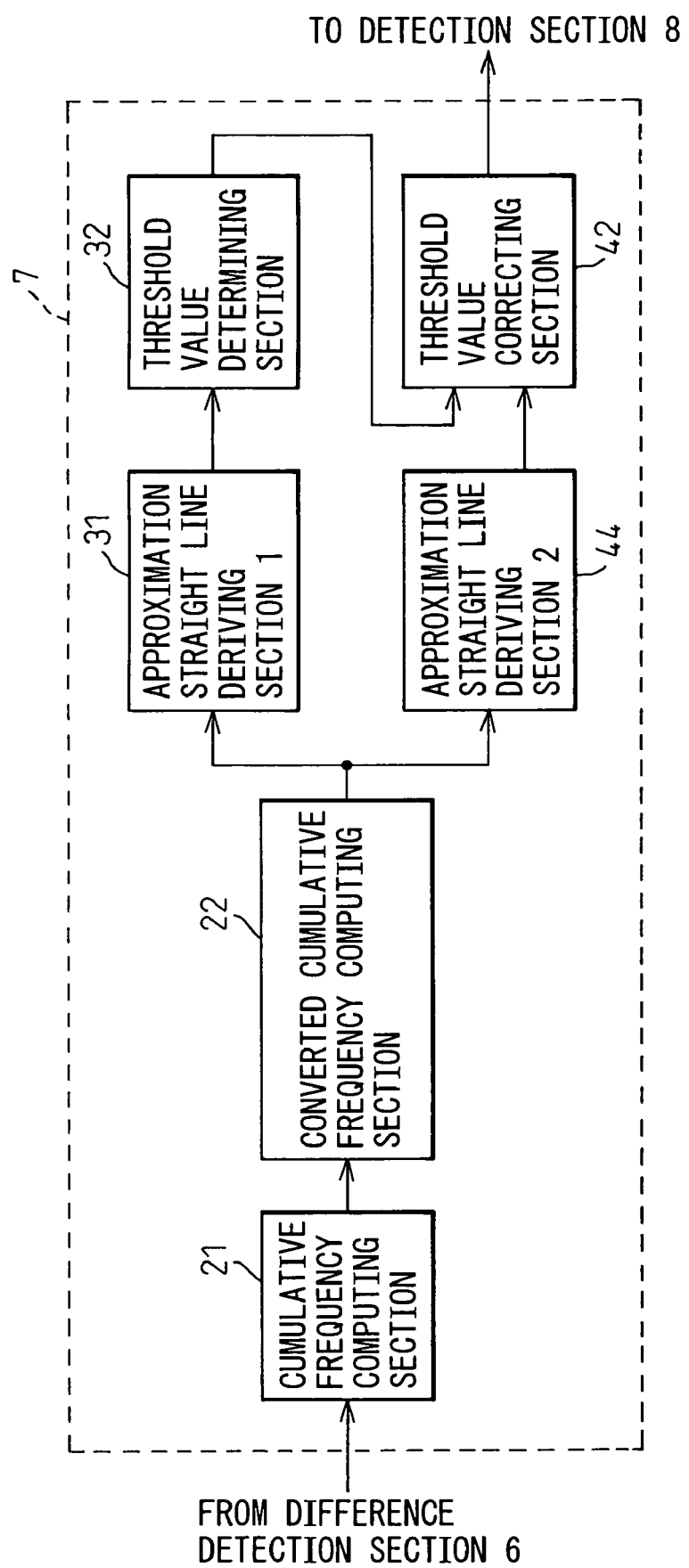
FIG. 15 is a block diagram showing a third configuration example of the detection threshold value calculation section.

FIG. 15 is a block diagram showing a third configuration example of the detection threshold value calculation section 7 of the appearance inspection apparatus shown in FIG. 3. In this configuration example, the detection threshold value calculation section 7 includes a second approximation straight line deriving section 44 which performs straight line approximations on a plurality of segments of the converted cumulative frequency obtained by the converted cumulative frequency computing section 22, and derives the approximation straight lines for the respective segments.

Figure 16:
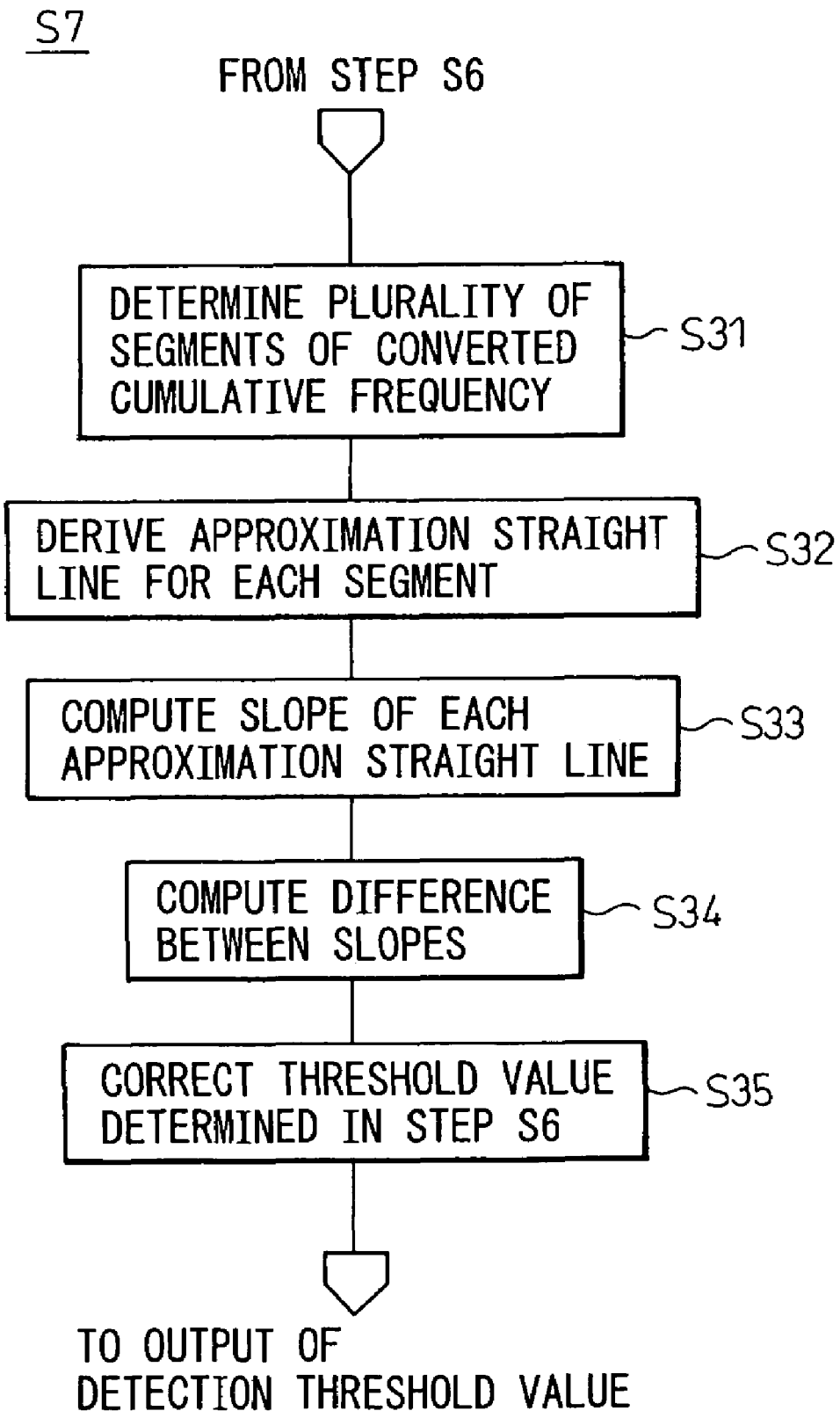
FIG. 16 is a flowchart illustrating a threshold value correction routine (step S7 in FIG. 6) which is executed by the detection threshold value calculation section shown in FIG. 15.

FIG. 16 is a flowchart illustrating the threshold value correction routine (step S7 in FIG. 6) which is executed by the detection threshold value calculation section 7 shown in FIG. 15, and FIGS. 17A to 17C and 18A to 18C are diagrams for explaining examples of the method for correcting the threshold value based on the approximation straight lines of the converted cumulative frequency.

In step S31 shown in FIG. 16, the approximation straight line deriving section 44 determines the plurality of segments into which the converted cumulative frequency obtained by the converted cumulative frequency computing section 22 is to be divided. In the example shown in FIG. 17A, the approximation straight line deriving section 44 determines these segments by dividing the converted cumulative frequency into two segments, a segment r1 where the gray level difference is smaller than a prescribed value x0 and a segment r2 where the gray level difference is larger than x0. On the other hand, in the example shown in FIG. 18A, the approximation straight line deriving section 44 determines these segments by dividing the converted cumulative frequency into two segments, a segment r1 where the converted cumulative frequency is smaller than a prescribed value p0 and a segment r2 where the converted cumulative frequency is larger than p0.

Figure 17A:
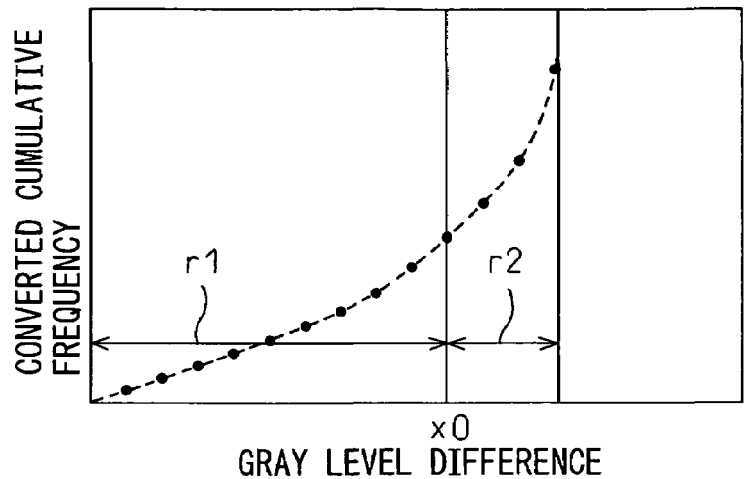
FIGS. 17A to 17C are diagrams (part 1) for explaining an example of a method for correcting the threshold value based on approximation straight lines of the converted cumulative frequency.
Figure 17B:
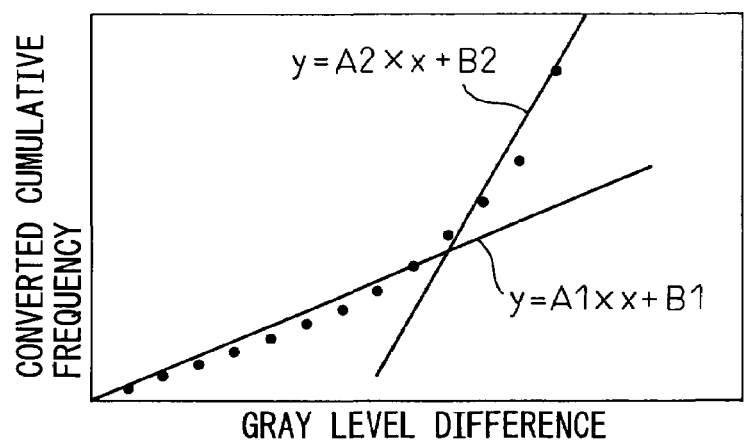
Figure 17C:
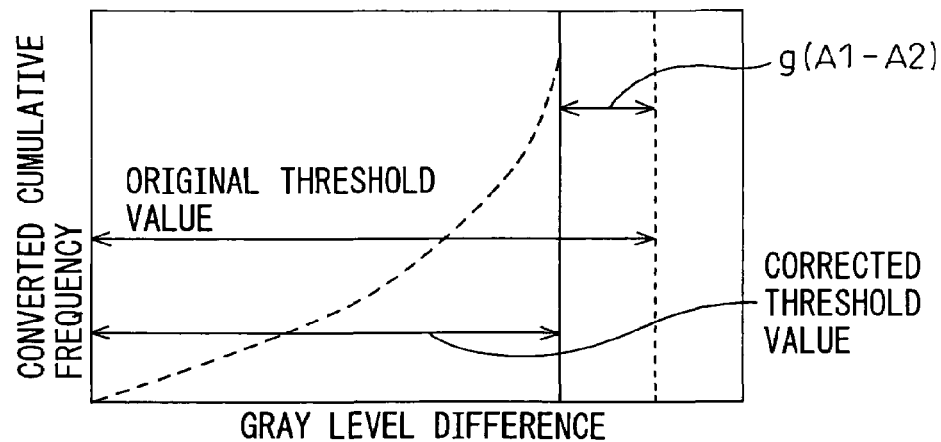
Figure 18A:
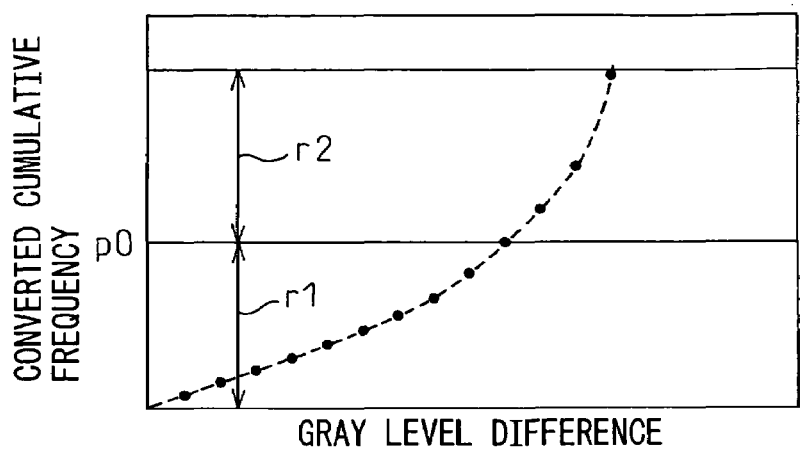
FIGS. 18A to 18C are diagrams (part 2) for explaining an example of a method for correcting the threshold value based on approximation straight lines of the converted cumulative frequency.
Figure 18B:
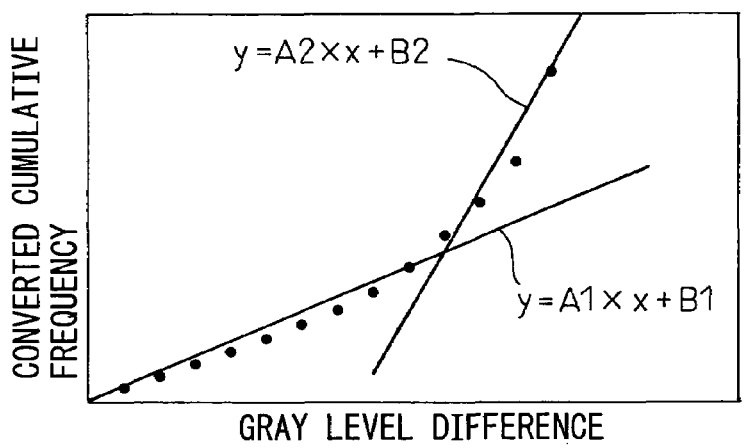
Figure 18C:
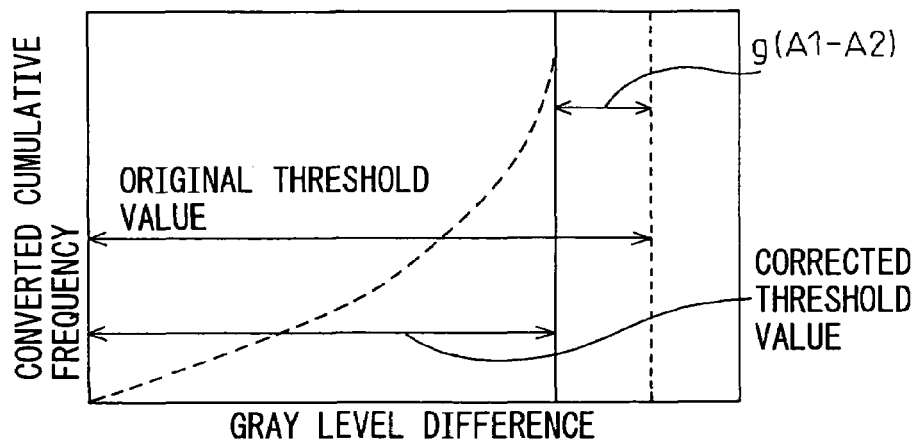
Figure 19A:
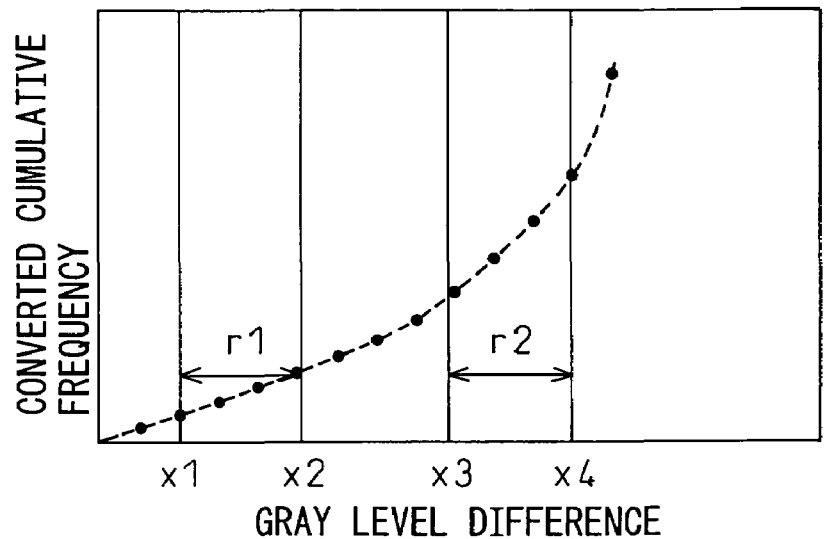
FIGS. 19A and 19B are diagrams for explaining a method for determining the segments of the converted cumulative frequency for each of which an approximation straight line is to be derived.
Figure 19B:
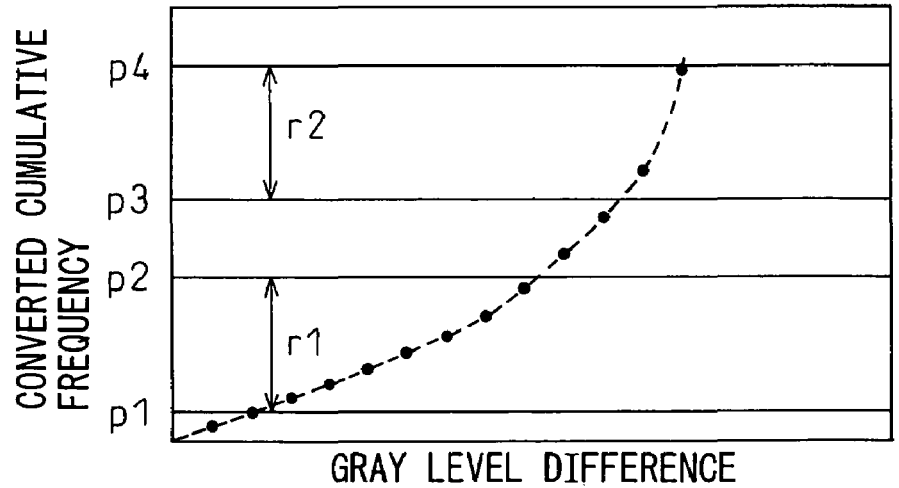

In the examples shown in FIGS. 17A to 17C and 18A to 18C, the segments have been determined so as to cover the entire region of the converted cumulative frequency, but alternatively, the segments may be determined so as to cover only selected portions of the converted cumulative frequency as shown in FIGS. 19A and 19B. In FIG. 19A, the segment where the gray level difference is small (x1 to x2) and the segment where the gray level difference is large (x3 to x4) are determined (x1<x2<x3<x4), while in FIG. 19B, the segment where the converted cumulative frequency is small (p1 to p2) and the segment where the converted cumulative frequency is large (p3 to p4) are determined (p1<p2<p3<p4).

In step S32, for the thus determined segments r1 and r2, the approximation straight line deriving section 44 derives the approximation straight lines $y = A1 \times x + B1$ (for the segment r1)

$y = A2 \times x + B2$ (for the segment r2)

Then, in step S33, the slopes A1 and A2 of the respective approximation straight lines are computed, which are supplied to the threshold value correcting section 42 (see FIGS. 17B and 18B).

In step S34, the threshold value correcting section 42 computes the difference (A1−A2) by subtracting the slope A2 of the approximation straight line in the segment r2 where the gray level difference (or the converted cumulative frequency) is large from the slope A1 of the approximation straight line in the segment r1 where the gray level difference (or the converted cumulative frequency) is small.

Then, in step S35, the threshold value determined by the threshold value determining section 32 in the above step S6 is corrected by the threshold value correcting section 42 based on the above computed difference in accordance with the following equation.

Corrected threshold value=Original threshold value+ $g(A1-A2)$

Here, a monotonic increasing function which basically has a monotonically increasing relationship with respect to x is employed as the function g(x).

According to the present invention, even when the distribution of the gray level difference between the images under inspection is different from the expected distribution, the detection threshold value can be set to an optimum value by correcting for the resulting effect.

The present invention is applicable to an image defect inspection method and apparatus in which two corresponding images under inspection are compared and, if their difference is large, either one of them is judged to be defective; in particular, the invention is applicable to an appearance inspection apparatus for detecting defects in a circuit pattern such as a semiconductor circuit pattern formed on a semiconductor wafer.

While the invention has been described with reference to specific embodiments chosen for purpose of illustration, it should be apparent that numerous modifications could be made thereto, by those skilled in the art, without departing from the basic concept and scope of the invention.

What is claimed is:

1. An image defect inspection method which detects a gray level difference between corresponding portions of two images, compares said detected gray level difference with a threshold value, and judges one or the other of said portions to be defective if said gray level difference is larger than said threshold value, comprising:
    a cumulative frequency computing step for computing a cumulative frequency of said gray level difference between said two images;
    a converted cumulative frequency computing step for computing a converted cumulative frequency by converting said cumulative frequency so that said cumulative frequency shows a linear relationship with respect to said gray level difference when said gray level difference is assumed to exhibit a distribution that obeys a prescribed type of distribution;
    an approximation curve deriving step for deriving an approximation curve of said converted cumulative frequency; and
    a threshold value correcting step for correcting said threshold value in accordance with a second derivative of said approximation curve with respect to said gray level difference, wherein
    said comparison is performed by using said corrected threshold value.

2. An image defect inspection method as claimed in claim 1, further comprising a threshold value determining step for deriving an approximation straight line by approximating said converted cumulative frequency by a straight line, and for determining said threshold value, based on said approximation straight line, from a prescribed cumulative frequency value in accordance with a prescribed calculation method, and wherein
    said threshold value correcting step corrects said threshold value determined in said threshold value determining step.

3. An image defect inspection method which detects a gray level difference between corresponding portions of two images, compares said detected gray level difference with a threshold value, and judges one or the other of said portions to be defective if said gray level difference is larger than said threshold value, comprising:

a cumulative frequency computing step for computing a cumulative frequency of said gray level difference between said two images;

a converted cumulative frequency computing step for computing a converted cumulative frequency by converting said cumulative frequency so that said cumulative frequency shows a linear relationship with respect to said gray level difference when said gray level difference is assumed to exhibit a distribution that obeys a prescribed type of distribution;

an approximation function deriving step for deriving an approximation function by approximating said converted cumulative frequency by a prescribed function; and a threshold value correcting step for correcting said threshold value in accordance with a second derivative of said approximation function with respect to said gray level difference, wherein said comparison is performed by using said corrected threshold value.

4. An image defect inspection method as claimed in claim 3, wherein said approximation function is a quadratic function of said gray level difference.

5. An image defect inspection method as claimed in claim 3, further comprising a threshold value determining step for deriving an approximation straight line by approximating said converted cumulative frequency by a straight line, and for determining said threshold value, based on said approximation straight line, from a prescribed cumulative frequency value in accordance with a prescribed calculation method, and wherein said threshold value correcting step corrects said threshold value determined in said threshold value determining step.

6. An image defect inspection method which detects a gray level difference between corresponding portions of two images, compares said detected gray level difference with a threshold value, and judges one or the other of said portions to be defective if said gray level difference is larger than said threshold value, comprising:

a cumulative frequency computing step for computing a cumulative frequency of said gray level difference between said two images;

a converted cumulative frequency computing step for computing a converted cumulative frequency by converting said cumulative frequency so that said cumulative frequency shows a linear relationship with respect to said gray level difference when said gray level difference is assumed to exhibit a distribution that obeys a prescribed type of distribution;

an approximation straight line deriving step for approximating each of a plurality of segments of said converted cumulative frequency by a straight line, thereby deriving approximation straight lines for said plurality of segments; and a threshold value correcting step for correcting said threshold value in accordance with a difference in slope between said approximation straight lines, wherein said comparison is performed by using said corrected threshold value.

7. An image defect inspection method as claimed in claim 6, wherein said approximation straight line deriving step derives said approximation straight lines, one for a segment where said gray level difference is larger than a prescribed value and the other for a segment where said gray level difference is smaller than said prescribed value.

8. An image defect inspection method as claimed in claim 6, wherein said approximation straight line deriving step derives said approximation straight lines, one for a segment where said converted cumulative frequency is larger than a prescribed value and the other for a segment where said converted cumulative frequency is smaller than said prescribed value.

9. An image defect inspection method as claimed in claim 6, further comprising a threshold value determining step for deriving an approximation straight line by approximating said converted cumulative frequency by a straight line, and for determining said threshold value, based on said approximation straight line, from a prescribed cumulative frequency value in accordance with a prescribed calculation method, and wherein said threshold value correcting step corrects said threshold value determined in said threshold value determining step.

10. An image defect inspection apparatus which detects a gray level difference between corresponding portions of two images, compares said detected gray level difference with a threshold value, and judges one or the other of said portions to be defective if said gray level difference is larger than said threshold value, comprising:

a cumulative frequency computing section which computes a cumulative frequency of said gray level difference between said two images;

a converted cumulative frequency computing section which computes a converted cumulative frequency by converting said cumulative frequency so that said cumulative frequency shows a linear relationship with respect to said gray level difference when said gray level difference is assumed to exhibit a distribution that obeys a prescribed type of distribution;

an approximation curve deriving section which derives an approximation curve of said converted cumulative frequency; and a threshold value correcting section which corrects said threshold value in accordance with a second derivative of said approximation curve with respect to said gray level difference, wherein said comparison is performed by using said corrected threshold value.

11. An image defect inspection apparatus as claimed in claim 10, further comprising a threshold value determining section which derives an approximation straight line by approximating said converted cumulative frequency by a straight line, and determines said threshold value, based on said approximation straight line, from a prescribed cumulative frequency value in accordance with a prescribed calculation apparatus, and wherein said threshold value correcting section corrects said threshold value determined by said threshold value determining section.

12. An appearance inspection apparatus for detecting a defect in a semiconductor circuit pattern formed on a semiconductor wafer, comprising:

imaging section which generates an image of said semiconductor circuit pattern formed on said semiconductor wafer; and an image defect inspection apparatus as claimed in claim 10, wherein said image defect inspection apparatus detects a defect in said semiconductor circuit pattern.

13. An image defect inspection apparatus which detects a gray level difference between corresponding portions of two images, compares said detected gray level difference with a threshold value, and judges one or the other of said portions to be defective if said gray level difference is larger than said threshold value, comprising:

a cumulative frequency computing section which computes a cumulative frequency of said gray level difference between said two images;

a converted cumulative frequency computing section which computes a converted cumulative frequency by converting said cumulative frequency so that said cumulative frequency shows a linear relationship with respect to said gray level difference when said gray level difference is assumed to exhibit a distribution that obeys a prescribed type of distribution;

an approximation function deriving section which derives an approximation function by approximating said converted cumulative frequency by a prescribed function; and a threshold value correcting section for correcting said threshold value in accordance with a second derivative of said approximation function with respect to said gray level difference, wherein said comparison is performed by using said corrected threshold value.

14. An image defect inspection apparatus as claimed in claim 13, wherein said approximation function is a quadratic function of said gay level difference.

15. An image defect inspection apparatus as claimed in claim 13, further comprising a threshold value determining section which derives an approximation straight line by approximating said converted cumulative frequency by a straight line, and determines said threshold value, based on said approximation straight line, from a prescribed cumulative frequency value in accordance with a prescribed calculation apparatus, and wherein said threshold value correcting section corrects said threshold value determined by said threshold value determining section.

16. An appearance inspection apparatus for detecting a defect in a semiconductor circuit pattern formed on a semiconductor wafer, comprising:

imaging section which generates an image of said semiconductor circuit pattern formed on said semiconductor wafer; and an image defect inspection apparatus as claimed in claim 13, wherein said image defect inspection apparatus detects a defect in said semiconductor circuit pattern.

17. An image defect inspection apparatus which detects a gray level difference between corresponding portions of two images, compares said detected gray level difference with a threshold value, and judges one or the other of said portions to be defective if said gray level difference is larger than said threshold value, comprising:

a cumulative frequency computing section which computes a cumulative frequency of said gray level difference between said two images;

a converted cumulative frequency computing section which computes a converted cumulative frequency by converting said cumulative frequency so that said cumulative frequency shows a linear relationship with respect to said gray level difference when said gray level difference is assumed to exhibit a distribution that obeys a prescribed type of distribution;

an approximation straight line deriving section which approximates each of a plurality of segments of said converted cumulative frequency by a straight line, thereby deriving approximation straight lines for said plurality of segments; and a threshold value correcting section for correcting said threshold value in accordance with a difference in slope between said approximation straight lines, wherein said comparison is performed by using said corrected threshold value.

18. An image defect inspection apparatus as claimed in claim 17, wherein said approximation straight line deriving section derives said approximation straight lines, one for a segment where said gray level difference is larger than a prescribed value and the other for a segment where said gray level difference is smaller than said prescribed value.

19. An image defect inspection apparatus as claimed in claim 17, wherein said approximation straight line deriving section derives said approximation straight lines, one for a segment where said converted cumulative frequency is larger than a prescribed value and the other for a segment where said converted cumulative frequency is smaller than said prescribed value.

20. An image defect inspection apparatus as claimed in claim 17, further comprising a threshold value determining section which derives an approximation straight line by approximating said converted cumulative frequency by a straight line, and determines said threshold value, based on said approximation straight line, from a prescribed cumulative frequency value in accordance with a prescribed calculation apparatus, and wherein said threshold value correcting section corrects said threshold value determined in said threshold value determining section.

21. An appearance inspection apparatus for detecting a defect in a semiconductor circuit pattern formed on a semiconductor wafer, comprising:

imaging section which generates an image of said semiconductor circuit pattern formed on said semiconductor wafer; and an image defect inspection apparatus as claimed in claim 17, wherein said image defect inspection apparatus detects a defect in said semiconductor circuit pattern.

\* \* \* \* \*

UNITED STATES PATENT AND TRADEMARK OFFICE
CERTIFICATE OF CORRECTION

PATENT NO. : 7,346,207 B2 Page 1 of 1
APPLICATION NO. : 11/298113
DATED : March 18, 2008
INVENTOR(S) : Akio Ishikawa It is certified that error appears in the above-identified patent and that said Letters Patent is hereby corrected as shown below:

In the Claims

Column 17, line 29, Claim 14    Delete "gay",
                                Insert --gray--

Signed and Sealed this

Eighteenth Day of November, 2008

JON W. DUDAS
*Director of the United States Patent and Trademark Office*